US011254331B2

(12) United States Patent
Ryu et al.

(10) Patent No.: US 11,254,331 B2
(45) Date of Patent: Feb. 22, 2022

(54) LEARNING METHOD AND LEARNING DEVICE FOR UPDATING OBJECT DETECTOR, BASED ON DEEP LEARNING, OF AUTONOMOUS VEHICLE TO ADAPT THE OBJECT DETECTOR TO DRIVING CIRCUMSTANCE, AND UPDATING METHOD AND UPDATING DEVICE USING THE SAME

(71) Applicant: Stradvision, Inc., Pohang-si (KR)

(72) Inventors: Wooju Ryu, Pohang-si (KR); Hongmo Je, Pohang-si (KR); Bongnam Kang, Pohang-si (KR); Yongjoong Kim, Pohang-si (KR)

(73) Assignee: STRADVISION, INC., Gyeongsandbuk-Do (KR)

( * ) Notice: Subject to any disclaimer, the term of this patent is extended or adjusted under 35 U.S.C. 154(b) by 0 days.

(21) Appl. No.: 17/229,264

(22) Filed: Apr. 13, 2021

(65) Prior Publication Data
US 2021/0354721 A1 Nov. 18, 2021

Related U.S. Application Data

(60) Provisional application No. 63/024,657, filed on May 14, 2020.

(51) Int. Cl.
*B60W 60/00* (2020.01)
*G06K 9/62* (2006.01)
(Continued)

(52) U.S. Cl.
CPC ......... *B60W 60/001* (2020.02); *G06K 9/3233* (2013.01); *G06K 9/6232* (2013.01);
(Continued)

(58) Field of Classification Search
USPC .......................................... 701/23
See application file for complete search history.

(56) References Cited

U.S. PATENT DOCUMENTS

2018/0211128 A1* 7/2018 Hotson ................ G06K 9/4604
2018/0211403 A1* 7/2018 Hotson .................... G06T 7/60
(Continued)

OTHER PUBLICATIONS

Zhu Xinge et al.: "Adapting Object Detectors via Selective Cross-Domain Alignment", Conference on Computer Vision and Pattern Recognition, IEEE, Jun. 15, 2019, pp. 687-696.

*Primary Examiner* — Tyler D Paige
(74) *Attorney, Agent, or Firm* — GableGotwals

(57) ABSTRACT

A method for updating an object detector of an autonomous vehicle to adapt the object detector to a driving circumstance is provided. The method includes steps of: a learning device (a) (i) inputting a training image, corresponding to a driving circumstance, into a circumstance-specific object detector to apply (i-1) convolution to the training image to generate a circumstance-specific feature map, (i-2) ROI pooling to the circumstance-specific feature map to generate a circumstance-specific pooled feature map, and (i-3) fully-connected operation to the circumstance-specific pooled feature map to generate circumstance-specific object detection information and (ii) inputting the circumstance-specific feature map into a circumstance-specific ranking network to (ii-1) apply deconvolution to the circumstance-specific feature map and generate a circumstance-specific segmentation map and (ii-2) generate a circumstance-specific rank score via a circumstance-specific discriminator; and (b) training the circumstance-specific object detector, the circumstance-specific deconvolutional layer, the circumstance-specific convolutional layer, and the circumstance-specific discriminator.

20 Claims, 7 Drawing Sheets

(51) Int. Cl.
*G06K 9/32* (2006.01)
*G06N 3/08* (2006.01)
(52) U.S. Cl.
CPC ............. *G06K 9/6259* (2013.01); *G06N 3/08* (2013.01); *B60W 2420/42* (2013.01)

(56) References Cited

U.S. PATENT DOCUMENTS

| | | | | |
|---|---|---|---|---|
| 2019/0050648 | A1* | 2/2019 | Stojanovic | G06T 11/60 |
| 2019/0147331 | A1* | 5/2019 | Arditi | G05D 1/0274 |
| | | | | 706/20 |
| 2019/0370574 | A1* | 12/2019 | Wang | G06N 3/08 |
| 2019/0382007 | A1* | 12/2019 | Casas | G06K 9/00335 |
| 2019/0384292 | A1* | 12/2019 | Aragon | G05D 1/0055 |

\* cited by examiner

LEARNING METHOD AND LEARNING DEVICE FOR UPDATING OBJECT DETECTOR, BASED ON DEEP LEARNING, OF AUTONOMOUS VEHICLE TO ADAPT THE OBJECT DETECTOR TO DRIVING CIRCUMSTANCE, AND UPDATING METHOD AND UPDATING DEVICE USING THE SAME

CROSS REFERENCE TO RELATED APPLICATION

This application claims the benefit of priority to U.S. Provisional Patent Application No. 63/024,657, filed on May 14, 2020, the entire contents of which being incorporated herein by reference.

FIELD OF THE DISCLOSURE

The present disclosure relates to updating of an object detector, based on deep learning, of an autonomous vehicle; and more particularly, to a learning method and a learning device for updating the object detector, based on the deep learning, of the autonomous vehicle in order to adapt the object detector to a driving circumstance, and an updating method and an updating device using the same.

BACKGROUND OF THE DISCLOSURE

Deep Convolutional Neural Networks (Deep CNNs) are at the heart of the remarkable development in deep learning. CNNs have already been used in the 90's to solve problems of character recognition, but their use has become as widespread as it is now thanks to recent researches. These deep CNNs won the 2012 ImageNet image classification tournament, crushing other competitors. Then, the CNNs became a very useful tool in the field of the machine learning.

The CNNs as such are used in various fields and may also be used, for example, in implementing an object detector installed on an autonomous vehicle.

However, a driving circumstance of the autonomous vehicle changes according to regions, time, weather, etc., and high-end computing resources are required to implement the object detector optimized for every driving circumstance that the autonomous vehicle may encounter.

However, in general, since limited computing resources are available to the autonomous vehicle, it is almost impossible to install a single object detector, optimized for various driving circumstances, on the autonomous vehicle.

Therefore, an improvement for solving these problems is required.

SUMMARY OF THE DISCLOSURE

It is an object of the present disclosure to solve all the aforementioned problems.

It is another object of the present disclosure to allow an autonomous vehicle to run smoothly in various driving circumstances.

It is still another object of the present disclosure to allow an object detector of the autonomous vehicle to be updated as an optimal object detector suitable for each driving circumstance.

In order to accomplish the objects above, distinctive structures of the present disclosure are described as follows.

In accordance with one aspect of the present disclosure, there is provided a method for updating an object detector, based on deep learning, of an autonomous vehicle to adapt the object detector to a driving circumstance, including steps of: (a) if at least one k-th training image is acquired from first training images to n-th training images, wherein each of the first training images corresponds to a first driving circumstance and includes a first object label and a first segmentation label, wherein each of the n-th training images corresponds to an n-th driving circumstance and includes an n-th object label and an n-th segmentation label, and wherein k is an integer ranging from 1 to n, a learning device performing or supporting another device to perform (i) a process of inputting the k-th training image into a k-th circumstance-specific object detector, corresponding to a k-th driving circumstance, among a first object detector corresponding to the first driving circumstance to an n-th object detector corresponding to the n-th driving circumstance, to thereby allow the k-th circumstance-specific object detector to (i-1) apply at least one convolution operation to the k-th training image and thus generate a k-th circumstance-specific feature map, via at least one k-th circumstance-specific convolutional layer of the k-th circumstance-specific object detector, (i-2) apply at least one ROI pooling operation to the k-th circumstance-specific feature map by using k-th circumstance-specific ROI information corresponding to at least one region, estimated as including at least one object, on the k-th circumstance-specific feature map and thus generate a k-th circumstance-specific pooled feature map, via a k-th circumstance-specific pooling layer of the k-th circumstance-specific object detector, and (i-3) apply at least one fully-connected operation to the k-th circumstance-specific pooled feature map and thus generate k-th circumstance-specific object detection information, via a k-th circumstance-specific FC layer of the k-th circumstance-specific object detector and (ii) a process of inputting the k-th circumstance-specific feature map into a k-th circumstance-specific ranking network, corresponding to the k-th circumstance-specific object detector, among a first ranking network corresponding to the first object detector to an n-th ranking network corresponding to the n-th object detector, to thereby allow the k-th circumstance-specific ranking network to (ii-1) apply at least one deconvolution operation to the k-th circumstance-specific feature map and thus generate a k-th circumstance-specific segmentation map, via at least one k-th circumstance-specific deconvolutional layer of the k-th circumstance-specific ranking network and (ii-2) generate a k-th circumstance-specific rank score, representing whether a k-th circumstance-specific rank map is real or fake, via a k-th circumstance-specific discriminator of the k-th circumstance-specific ranking network, wherein the k-th circumstance-specific rank map is created by cropping a main region on the k-th training image and its corresponding first subordinate region on a k-th circumstance-specific segmentation map and then by concatenating the main region and the first subordinate region; and (b) the learning device performing or supporting another device to perform (i) a process of training the k-th circumstance-specific object detector such that k-th circumstance-specific object detection losses, calculated by referring to the k-th circumstance-specific object detection information and its corresponding k-th circumstance-specific object label, are minimized and a process of training the k-th circumstance-specific deconvolutional layer and the k-th circumstance-specific convolutional layer such that the k-th circumstance-specific rank score is maximized and (ii) a process of training the k-th circumstance-specific discriminator such that a k-th circumstance-specific label rank score on a k-th circumstance-specific label rank map is maximized and such that the k-th circumstance-specific rank score is minimized, wherein the k-th circumstance-specific label rank map is created by cropping the main region on the k-th training image and its corresponding second subordinate region on a k-th circumstance-specific segmentation label and then by concatenating the main region and the second subordinate region and wherein the k-th circumstance-specific label rank score is calculated by the k-th circumstance-specific discriminator.

As one example, at the step of (a), the learning device performs or supports another device to perform a process of allowing the k-th circumstance-specific ranking network to further generate at least one j-th circumstance-specific rank score, representing whether at least one j-th circumstance-specific rank map is real or fake, via the k-th circumstance-specific discriminator, wherein at least one j-th circumstance-specific convolutional layer applies the convolution operation to the k-th training image to thereby create at least one j-th circumstance-specific feature map, wherein at least one j-th circumstance-specific deconvolutional layer, corresponding to the j-th circumstance-specific convolutional layer, applies the deconvolution operation to the j-th circumstance-specific feature map to thereby generate at least one j-th circumstance-specific segmentation map, wherein the j-th circumstance-specific rank map is created by cropping the main region on the k-th training image and its corresponding at least one third subordinate region on the j-th circumstance-specific segmentation map and then by concatenating the main region and the third subordinate region, and wherein j is an integer, different from k, ranging from 1 to n, and wherein, at the step of (b), the learning device performs or supports another device to perform a process of training the k-th circumstance-specific discriminator such that the k-th circumstance-specific label rank score is maximized and such that each of the k-th circumstance-specific rank score and the j-th circumstance-specific rank score is minimized.

As one example, at the step of (b), the learning device performs or supports another device to perform a process of training each of the k-th circumstance-specific deconvolutional layer and the k-th circumstance-specific convolutional layer such that k-th circumstance-specific segmentation losses, calculated by referring to the k-th circumstance-specific segmentation map and its corresponding k-th circumstance-specific segmentation label, are minimized and such that the k-th circumstance-specific rank score is maximized.

As one example, the k-th circumstance-specific discriminator includes a Convolutional PatchGAN classifier.

As one example, at the step of (a), the learning device performs or supports another device to perform a process of allowing the k-th circumstance-specific object detector to generate the k-th circumstance-specific ROI information via a k-th circumstance-specific RPN layer of the k-th circumstance-specific object detector, and wherein, at the step of (b), the learning device performs or supports another device to perform a process of further training the k-th circumstance-specific RPN layer such that k-th circumstance-specific RPN losses, calculated by referring to the k-th circumstance-specific ROI information and its corresponding k-th circumstance-specific object label, are minimized.

In accordance with another aspect of the present disclosure, there is provided a method for updating an object detector, based on deep learning, of an autonomous vehicle to adapt the object detector to a driving circumstance, including steps of: (a) an updating device, on condition that a learning device has performed or supported another device to perform, upon acquiring at least one k-th training image from first training images to n-th training images, wherein each of the first training images corresponds to a first driving circumstance and includes a first object label and a first segmentation label, wherein each of the n-th training images corresponds to an n-th driving circumstance and includes an n-th object label and an n-th segmentation label, and wherein k is an integer ranging from 1 to n, (i) a process of inputting the k-th training image into a k-th circumstance-specific object detector, corresponding to a k-th driving circumstance, among a first object detector corresponding to the first driving circumstance to an n-th object detector corresponding to the n-th driving circumstance, to thereby allow the k-th circumstance-specific object detector to (i-1) apply at least one convolution operation to the k-th training image and thus generate a k-th circumstance-specific feature map, via at least one k-th circumstance-specific convolutional layer of the k-th circumstance-specific object detector, (i-2) apply at least one ROI pooling operation to the k-th circumstance-specific feature map by using k-th circumstance-specific ROI information corresponding to at least one region, estimated as including at least one object, on the k-th circumstance-specific feature map and thus generate a k-th circumstance-specific pooled feature map, via a k-th circumstance-specific pooling layer of the k-th circumstance-specific object detector, and (i-3) apply at least one fully-connected operation to the k-th circumstance-specific pooled feature map and thus generate k-th circumstance-specific object detection information, via a k-th circumstance-specific FC layer of the k-th circumstance-specific object detector, (ii) a process of inputting the k-th circumstance-specific feature map into a k-th circumstance-specific ranking network, corresponding to the k-th circumstance-specific object detector, among a first ranking network corresponding to the first object detector to an n-th ranking network corresponding to the n-th object detector, to thereby allow the k-th circumstance-specific ranking network to (ii-1) apply at least one deconvolution operation to the k-th circumstance-specific feature map and thus generate a k-th circumstance-specific segmentation map, via at least one k-th circumstance-specific deconvolutional layer of the k-th circumstance-specific ranking network and (ii-2) generate a k-th circumstance-specific rank score, representing whether a k-th circumstance-specific rank map is real or fake, via a k-th circumstance-specific discriminator of the k-th circumstance-specific ranking network, wherein the k-th circumstance-specific rank map is created by cropping a main region on the k-th training image and its corresponding first subordinate region on a k-th circumstance-specific segmentation map and then by concatenating the main region and the first subordinate region, (iii) a process of training the k-th circumstance-specific object detector such that k-th circumstance-specific object detection losses, calculated by referring to the k-th circumstance-specific object detection information and its corresponding k-th circumstance-specific object label, are minimized and a process of training the k-th circumstance-specific deconvolutional layer and the k-th circumstance-specific convolutional layer such that the k-th circumstance-specific rank score is maximized, and (iv) a process of training the k-th circumstance-specific discriminator such that a k-th circumstance-specific label rank score on a k-th circumstance-specific label rank map is maximized and such that the k-th circumstance-specific rank score is minimized, wherein the k-th circumstance-specific label rank map is created by cropping the main region on the k-th training image and its corresponding second subordinate region on a k-th circumstance-specific segmentation label and then by concatenating the main region and the second subordinate region and wherein the k-th circumstance-specific label rank score is calculated by the k-th circumstance-specific discriminator, performing or supporting another device to perform a process of acquiring a driving circumstance image representing a driving circumstance of the autonomous vehicle; (b) the updating device performing or supporting another device to perform (i) a process of inputting the driving circumstance image into each of the first object detector to the n-th object detector, to thereby allow each of the first object detector to the n-th object detector to apply its corresponding at least one convolution operation to the driving circumstance image via its corresponding each of the first convolutional layer to the n-th convolutional layer and thus to generate each of a first driving circumstance feature map to an n-th driving circumstance feature map and (ii) a process of inputting the first driving circumstance feature map to the n-th driving circumstance feature map respectively into the first ranking network to the n-th ranking network, to thereby allow each of the first ranking network to the n-th ranking network to (ii-1) apply its corresponding at least one deconvolution operation to each of the first driving circumstance feature map to the n-th driving circumstance feature map via its corresponding each of the first deconvolutional layer to the n-th deconvolutional layer and thus generate each of a first driving circumstance segmentation map to an n-th driving circumstance segmentation map and (ii-2) generate a first driving circumstance rank score to an n-th driving circumstance rank score respectively via the first discriminator to the n-th discriminator, wherein the first driving circumstance rank score represents whether a first driving circumstance rank map is real or fake, wherein the first driving circumstance rank map is created by cropping a first driving main region on the driving circumstance image and its corresponding first driving subordinate region on the first driving circumstance segmentation map and then by concatenating the first driving main region and the first driving subordinate region, wherein the n-th driving circumstance rank score represents whether an n-th driving circumstance rank map is real or fake, and wherein the n-th driving circumstance rank map is created by cropping an n-th driving main region on the driving circumstance image and its corresponding n-th driving subordinate region on the n-th driving circumstance segmentation map and then by concatenating the n-th driving main region and the n-th driving subordinate region; and (c) the updating device performing or supporting another device to perform (i) a process of selecting a specific object detector corresponding to a specific ranking network which outputs a specific driving circumstance rank score, the specific driving circumstance rank score being a highest among the first driving circumstance rank score to the n-th driving circumstance rank score and (ii) a process of updating a current object detector of the autonomous vehicle as the specific object detector.

As one example, at the step of (a), the learning device has performed or supported another device to perform a process of allowing the k-th circumstance-specific ranking network to further generate at least one j-th circumstance-specific rank score, representing whether at least one j-th circumstance-specific rank map is real or fake, via the k-th circumstance-specific discriminator, wherein at least one j-th circumstance-specific convolutional layer applies the convolution operation to the k-th training image to thereby create at least one j-th circumstance-specific feature map, wherein at least one j-th circumstance-specific deconvolutional layer, corresponding to the j-th circumstance-specific convolutional layer, applies the deconvolution operation to the j-th circumstance-specific feature map to thereby generate at least one j-th circumstance-specific segmentation map, wherein the j-th circumstance-specific rank map is created by cropping the main region on the k-th training image and its corresponding at least one third subordinate region on the j-th circumstance-specific segmentation map and then by concatenating the main region and the third subordinate region, and wherein j is an integer, different from k, ranging from 1 to n, and a process of training the k-th circumstance-specific discriminator such that the k-th circumstance-specific label rank score is maximized and such that each of the k-th circumstance-specific rank score and the j-th circumstance-specific rank score is minimized.

As one example, at the step of (a), the learning device has performed or supported another device to perform a process of training each of the k-th circumstance-specific deconvolutional layer and the k-th circumstance-specific convolutional layer such that k-th circumstance-specific segmentation losses, calculated by referring to the k-th circumstance-specific segmentation map and its corresponding k-th circumstance-specific segmentation label, are minimized and such that the k-th circumstance-specific rank score is maximized.

As one example, the k-th circumstance-specific discriminator includes a Convolutional PatchGAN classifier.

As one example, at the step of (a), the learning device has performed or supported another device to perform a process of further training the k-th circumstance-specific RPN layer such that the k-th circumstance-specific object detector generates the k-th circumstance-specific ROI information via a k-th circumstance-specific RPN layer of the k-th circumstance-specific object detector and such that k-th circumstance-specific RPN losses, calculated by referring to the k-th circumstance-specific ROI information and its corresponding k-th circumstance-specific object label, are minimized.

In accordance with still another aspect of the present disclosure, there is provided a learning device for updating an object detector, based on deep learning, of an autonomous vehicle to adapt the object detector to a driving circumstance, including: at least one memory that stores instructions; and at least one processor configured to execute the instructions to perform or support another device to perform: (I) if at least one k-th training image is acquired from first training images to n-th training images, wherein each of the first training images corresponds to a first driving circumstance and includes a first object label and a first segmentation label, wherein each of the n-th training images corresponds to an n-th driving circumstance and includes an n-th object label and an n-th segmentation label, and wherein k is an integer ranging from 1 to n, (i) a process of inputting the k-th training image into a k-th circumstance-specific object detector, corresponding to a k-th driving circumstance, among a first object detector corresponding to the first driving circumstance to an n-th object detector corresponding to the n-th driving circumstance, to thereby allow the k-th circumstance-specific object detector to (i-1) apply at least one convolution operation to the k-th training image and thus generate a k-th circumstance-specific feature map, via at least one k-th circumstance-specific convolutional layer of the k-th circumstance-specific object detector, (i-2) apply at least one ROI pooling operation to the k-th circumstance-specific feature map by using k-th circumstance-specific ROI information corresponding to at least one region, estimated as including at least one object, on the k-th circumstance-specific feature map and thus generate a k-th circumstance-specific pooled feature map, via a k-th circumstance-specific pooling layer of the k-th circumstance-specific object detector, and (i-3) apply at least one fully-connected operation to the k-th circumstance-specific pooled feature map and thus generate k-th circumstance-specific object detection information, via a k-th circumstance-specific FC layer of the k-th circumstance-specific object detector and (ii) a process of inputting the k-th circumstance-specific feature map into a k-th circumstance-specific ranking network, corresponding to the k-th circumstance-specific object detector, among a first ranking network corresponding to the first object detector to an n-th ranking network corresponding to the n-th object detector, to thereby allow the k-th circumstance-specific ranking network to (ii-1) apply at least one deconvolution operation to the k-th circumstance-specific feature map and thus generate a k-th circumstance-specific segmentation map, via at least one k-th circumstance-specific deconvolutional layer of the k-th circumstance-specific ranking network and (ii-2) generate a k-th circumstance-specific rank score, representing whether a k-th circumstance-specific rank map is real or fake, via a k-th circumstance-specific discriminator of the k-th circumstance-specific ranking network, wherein the k-th circumstance-specific rank map is created by cropping a main region on the k-th training image and its corresponding first subordinate region on a k-th circumstance-specific segmentation map and then by concatenating the main region and the first subordinate region, and (II) (i) a process of training the k-th circumstance-specific object detector such that k-th circumstance-specific object detection losses, calculated by referring to the k-th circumstance-specific object detection information and its corresponding k-th circumstance-specific object label, are minimized and a process of training the k-th circumstance-specific deconvolutional layer and the k-th circumstance-specific convolutional layer such that the k-th circumstance-specific rank score is maximized and (ii) a process of training the k-th circumstance-specific discriminator such that a k-th circumstance-specific label rank score on a k-th circumstance-specific label rank map is maximized and such that the k-th circumstance-specific rank score is minimized, wherein the k-th circumstance-specific label rank map is created by cropping the main region on the k-th training image and its corresponding second subordinate region on a k-th circumstance-specific segmentation label and then by concatenating the main region and the second subordinate region and wherein the k-th circumstance-specific label rank score is calculated by the k-th circumstance-specific discriminator.

As one example, at the process of (I), the processor performs or supports another device to perform a process of allowing the k-th circumstance-specific ranking network to further generate at least one j-th circumstance-specific rank score, representing whether at least one j-th circumstance-specific rank map is real or fake, via the k-th circumstance-specific discriminator, wherein at least one j-th circumstance-specific convolutional layer applies the convolution operation to the k-th training image to thereby create at least one j-th circumstance-specific feature map, wherein at least one j-th circumstance-specific deconvolutional layer, corresponding to the j-th circumstance-specific convolutional layer, applies the deconvolution operation to the j-th circumstance-specific feature map to thereby generate at least one j-th circumstance-specific segmentation map, wherein the j-th circumstance-specific rank map is created by cropping the main region on the k-th training image and its corresponding at least one third subordinate region on the j-th circumstance-specific segmentation map and then by concatenating the main region and the third subordinate region, and wherein j is an integer, different from k, ranging from 1 to n, and wherein, at the process of (II), the processor performs or supports another device to perform a process of training the k-th circumstance-specific discriminator such that the k-th circumstance-specific label rank score is maximized and such that each of the k-th circumstance-specific rank score and the j-th circumstance-specific rank score is minimized.

As one example, at the process of (II), the processor performs or supports another device to perform a process of training each of the k-th circumstance-specific deconvolutional layer and the k-th circumstance-specific convolutional layer such that k-th circumstance-specific segmentation losses, calculated by referring to the k-th circumstance-specific segmentation map and its corresponding k-th circumstance-specific segmentation label, are minimized and such that the k-th circumstance-specific rank score is maximized.

As one example, the k-th circumstance-specific discriminator includes a Convolutional PatchGAN classifier.

As one example, at the process of (I), the processor performs or supports another device to perform a process of allowing the k-th circumstance-specific object detector to generate the k-th circumstance-specific ROI information via a k-th circumstance-specific RPN layer of the k-th circumstance-specific object detector, and wherein, at the process of (II), the processor performs or supports another device to perform a process of further training the k-th circumstance-specific RPN layer such that k-th circumstance-specific RPN losses, calculated by referring to the k-th circumstance-specific ROI information and its corresponding k-th circumstance-specific object label, are minimized.

In accordance with still yet another aspect of the present disclosure, there is provided an updating device for updating an object detector, based on deep learning, of an autonomous vehicle to adapt the object detector to a driving circumstance, including: at least one memory that stores instructions; and at least one processor configured to execute the instructions to perform or support another device to perform: (I) on condition that a learning device has performed or supported another device to perform, upon acquiring at least one k-th training image from first training images to n-th training images, wherein each of the first training images corresponds to a first driving circumstance and includes a first object label and a first segmentation label, wherein each of the n-th training images corresponds to an n-th driving circumstance and includes an n-th object label and an n-th segmentation label, and wherein k is an integer ranging from 1 to n, (i) a process of inputting the k-th training image into a k-th circumstance-specific object detector, corresponding to a k-th driving circumstance, among a first object detector corresponding to the first driving circumstance to an n-th object detector corresponding to the n-th driving circumstance, to thereby allow the k-th circumstance-specific object detector to (i-1) apply at least one convolution operation to the k-th training image and thus generate a k-th circumstance-specific feature map, via at least one k-th circumstance-specific convolutional layer of the k-th circumstance-specific object detector, (i-2) apply at least one ROI pooling operation to the k-th circumstance-specific feature map by using k-th circumstance-specific ROI information corresponding to at least one region, estimated as including at least one object, on the k-th circumstance-specific feature map and thus generate a k-th circumstance-specific pooled feature map, via a k-th circumstance-specific pooling layer of the k-th circumstance-specific object detector, and (i-3) apply at least one fully-connected operation to the k-th circumstance-specific pooled feature map and thus generate k-th circumstance-specific object detection information, via a k-th circumstance-specific FC layer of the k-th circumstance-specific object detector, (ii) a process of inputting the k-th circumstance-specific feature map into a k-th circumstance-specific ranking network, corresponding to the k-th circumstance-specific object detector, among a first ranking network corresponding to the first object detector to an n-th ranking network corresponding to the n-th object detector, to thereby allow the k-th circumstance-specific ranking network to (ii-1) apply at least one deconvolution operation to the k-th circumstance-specific feature map and thus generate a k-th circumstance-specific segmentation map, via at least one k-th circumstance-specific deconvolutional layer of the k-th circumstance-specific ranking network and (ii-2) generate a k-th circumstance-specific rank score, representing whether a k-th circumstance-specific rank map is real or fake, via a k-th circumstance-specific discriminator of the k-th circumstance-specific ranking network, wherein the k-th circumstance-specific rank map is created by cropping a main region on the k-th training image and its corresponding first subordinate region on a k-th circumstance-specific segmentation map and then by concatenating the main region and the first subordinate region, (iii) a process of training the k-th circumstance-specific object detector such that k-th circumstance-specific object detection losses, calculated by referring to the k-th circumstance-specific object detection information and its corresponding k-th circumstance-specific object label, are minimized and a process of training the k-th circumstance-specific deconvolutional layer and the k-th circumstance-specific convolutional layer such that the k-th circumstance-specific rank score is maximized, and (iv) a process of training the k-th circumstance-specific discriminator such that a k-th circumstance-specific label rank score on a k-th circumstance-specific label rank map is maximized and such that the k-th circumstance-specific rank score is minimized, wherein the k-th circumstance-specific label rank map is created by cropping the main region on the k-th training image and its corresponding second subordinate region on a k-th circumstance-specific segmentation label and then by concatenating the main region and the second subordinate region and wherein the k-th circumstance-specific label rank score is calculated by the k-th circumstance-specific discriminator, a process of acquiring a driving circumstance image representing a driving circumstance of the autonomous vehicle, (II) (i) a process of inputting the driving circumstance image into each of the first object detector to the n-th object detector, to thereby allow each of the first object detector to the n-th object detector to apply its corresponding at least one convolution operation to the driving circumstance image via its corresponding each of the first convolutional layer to the n-th convolutional layer and thus to generate each of a first driving circumstance feature map to an n-th driving circumstance feature map and (ii) a process of inputting the first driving circumstance feature map to the n-th driving circumstance feature map respectively into the first ranking network to the n-th ranking network, to thereby allow each of the first ranking network to the n-th ranking network to (ii-1) apply its corresponding at least one deconvolution operation to each of the first driving circumstance feature map to the n-th driving circumstance feature map via its corresponding each of the first deconvolutional layer to the n-th deconvolutional layer and thus generate each of a first driving circumstance segmentation map to an n-th driving circumstance segmentation map and (ii-2) generate a first driving circumstance rank score to an n-th driving circumstance rank score respectively via the first discriminator to the n-th discriminator, wherein the first driving circumstance rank score represents whether a first driving circumstance rank map is real or fake, wherein the first driving circumstance rank map is created by cropping a first driving main region on the driving circumstance image and its corresponding first driving subordinate region on the first driving circumstance segmentation map and then by concatenating the first driving main region and the first driving subordinate region, wherein the n-th driving circumstance rank score represents whether an n-th driving circumstance rank map is real or fake, and wherein the n-th driving circumstance rank map is created by cropping an n-th driving main region on the driving circumstance image and its corresponding n-th driving subordinate region on the n-th driving circumstance segmentation map and then by concatenating the n-th driving main region and the n-th driving subordinate region, and (III) (i) a process of selecting a specific object detector corresponding to a specific ranking network which outputs a specific driving circumstance rank score, the specific driving circumstance rank score being a highest among the first driving circumstance rank score to the n-th driving circumstance rank score and (ii) a process of updating a current object detector of the autonomous vehicle as the specific object detector.

As one example, at the process of (I), the learning device has performed or supported another device to perform a process of allowing the k-th circumstance-specific ranking network to further generate at least one j-th circumstance-specific rank score, representing whether at least one j-th circumstance-specific rank map is real or fake, via the k-th circumstance-specific discriminator, wherein at least one j-th circumstance-specific convolutional layer applies the convolution operation to the k-th training image to thereby create at least one j-th circumstance-specific feature map, wherein at least one j-th circumstance-specific deconvolutional layer, corresponding to the j-th circumstance-specific convolutional layer, applies the deconvolution operation to the j-th circumstance-specific feature map to thereby generate at least one j-th circumstance-specific segmentation map, wherein the j-th circumstance-specific rank map is created by cropping the main region on the k-th training image and its corresponding at least one third subordinate region on the j-th circumstance-specific segmentation map and then by concatenating the main region and the third subordinate region, and wherein j is an integer, different from k, ranging from 1 to n, and a process of training the k-th circumstance-specific discriminator such that the k-th circumstance-specific label rank score is maximized and such that each of the k-th circumstance-specific rank score and the j-th circumstance-specific rank score is minimized.

As one example, at the process of (I), the learning device has performed or supported another device to perform a process of training each of the k-th circumstance-specific deconvolutional layer and the k-th circumstance-specific convolutional layer such that k-th circumstance-specific segmentation losses, calculated by referring to the k-th circumstance-specific segmentation map and its corresponding k-th circumstance-specific segmentation label, are minimized and such that the k-th circumstance-specific rank score is maximized.

As one example, the k-th circumstance-specific discriminator includes a Convolutional PatchGAN classifier.

As one example, at the process of (I), the learning device has performed or supported another device to perform a process of further training the k-th circumstance-specific RPN layer such that the k-th circumstance-specific object detector generates the k-th circumstance-specific ROI information via a k-th circumstance-specific RPN layer of the k-th circumstance-specific object detector and such that k-th circumstance-specific RPN losses, calculated by referring to the k-th circumstance-specific ROI information and its corresponding k-th circumstance-specific object label, are minimized.

In addition, recordable media readable by a computer for storing a computer program to execute the method of the present disclosure is further provided.

BRIEF DESCRIPTION OF THE DRAWINGS

The following drawings to be used to explain example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

Figure 1:
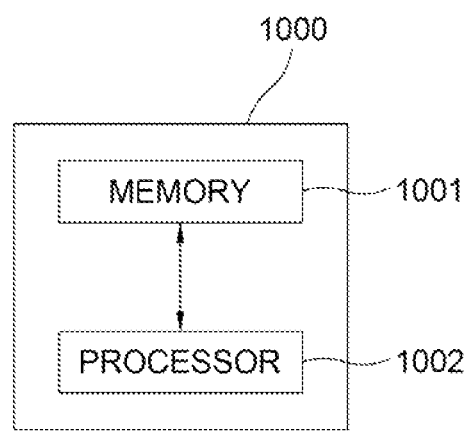
FIG. 1 is a drawing schematically illustrating a learning device for training each object detector corresponding to each driving circumstance and training each ranking network corresponding to said each object detector in accordance with one example embodiment of the present disclosure.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the invention.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, similar reference numerals refer to the same or similar functionality throughout the several aspects.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

The headings and abstract of the present disclosure provided herein are for convenience only and do not limit or interpret the scope or meaning of the embodiments. For reference, throughout the present disclosure, the phrase "for training" or "training" is added for terms related to training processes, and the phrase "for testing" or "testing" is added for terms related to testing processes, to avoid possible confusion.

To allow those skilled in the art to carry out the present disclosure easily, the example embodiments of the present disclosure by referring to attached diagrams will be explained in detail as shown below.

The description below discloses an example of vehicles, but the scope of the present disclosure is not limited thereto, and the present disclosure may be applied to any field where one or more cameras detect one or more objects in at least one certain regions, such as fields of military, surveillance, etc.

FIG. 1 is a drawing schematically illustrating a learning device 1000 for training each object detector corresponding to each driving circumstance and training each ranking network corresponding to said each object detector in accordance with one example embodiment of the present disclosure. By referring to FIG. 1, the learning device 1000 may include a memory 1001 for storing instructions to train each object detector corresponding to each driving circumstance and to train each ranking network corresponding to said each object detector, and a processor 1002 for performing processes of training said each object detector and its corresponding each ranking network according to the instructions in the memory 1001.

Specifically, the basic learning device 1000 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The processor of the computing device may include hardware configuration of MPU (Micro Processing Unit) or CPU (Central Processing Unit), cache memory, data bus, etc. Additionally, the computing device may further include software configuration of OS and applications that achieve specific purposes.

However, such description of the computing device does not exclude an integrated device including any combination of a processor, a memory, a medium, or any other computing components for implementing the present disclosure.

A learning method to be used for updating the object detector, based on deep learning, of an autonomous vehicle to adapt the object detector to the driving circumstance by using the learning device 1000 configured as such is described as follows by referring to FIGS. 2 and 3.

As used in this specification and the appended claims, the singular forms "a," "an," and "the" include plural referents, i.e., one or more, unless the content and context clearly dictates otherwise.

As one example, the learning device in accordance with the present disclosure may train multiple object detectors and their respectively corresponding multiple ranking networks, e.g., n object detectors and n ranking networks. However, for convenience of explanation, FIG. 2 only shows (1) a k-th circumstance-specific object detector 1100-k corresponding to a k-th driving circumstance and (2) a k-th circumstance-specific ranking network 1200-k corresponding to the k-th circumstance-specific object detector 1100-k. Herein, n may be an integer equal to or greater than 1. Further, k may be an integer equal to or greater than 1 and equal to or less than n.

Figure 2:
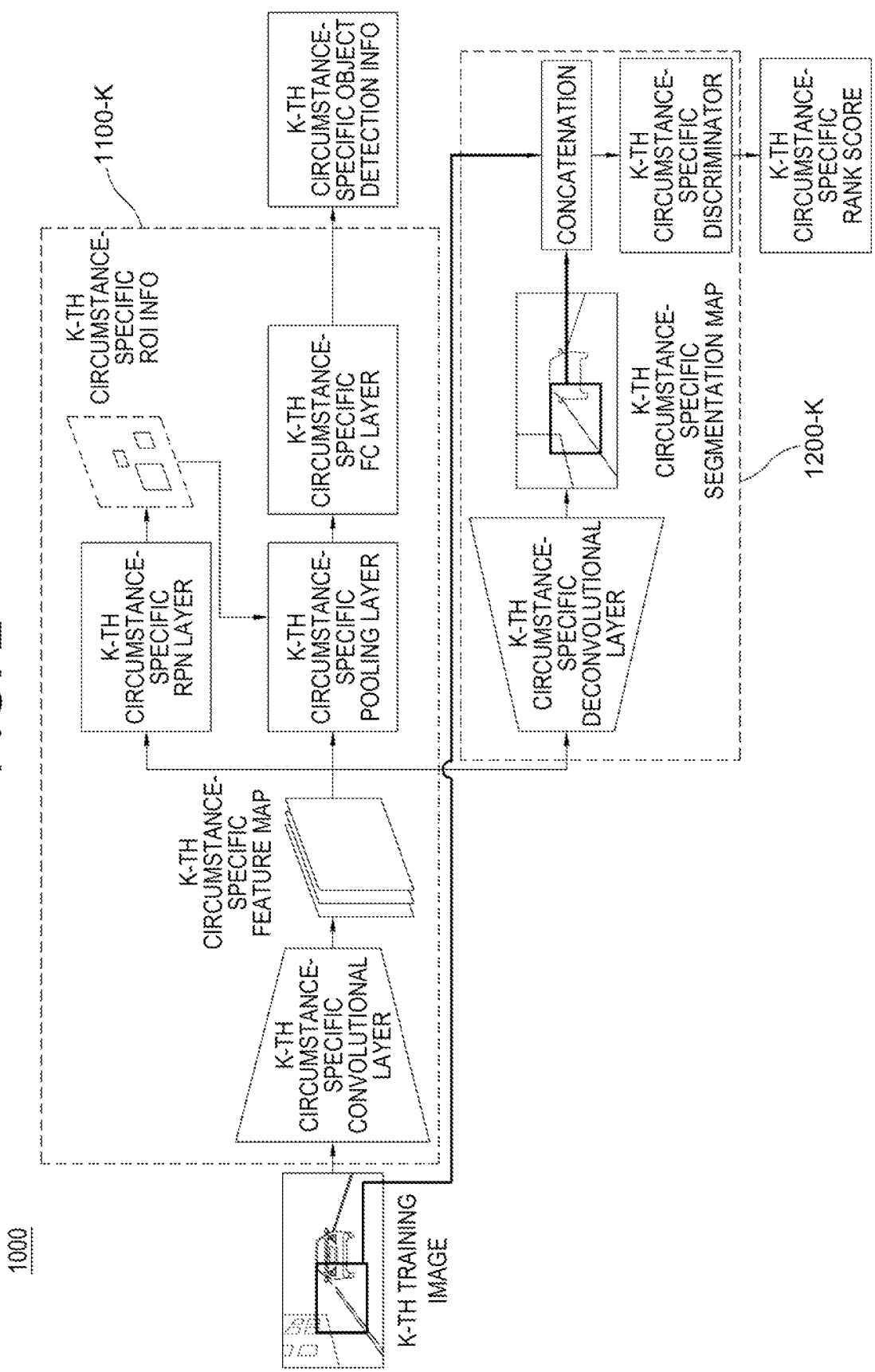
FIGS. 2 and 3 are drawings schematically illustrating processes of training said each object detector and its corresponding ranking network in order to update the object detector, based on deep learning, of an autonomous vehicle such that the object detector is adapted to the driving circumstance in accordance with one example embodiment of the present disclosure.

First, by referring to FIG. 2, the k-th circumstance-specific object detector 1100-k may include at least part of a k-th circumstance-specific convolutional layer, a k-th circumstance-specific pooling layer, a k-th circumstance-specific RPN (region proposal network) layer, and a k-th circumstance-specific FC (fully connected) layer.

Also, the k-th circumstance-specific ranking network 1200-k may include a k-th circumstance-specific deconvolutional layer and a k-th circumstance-specific discriminator.

Herein, each of discriminators may be a classifier for performing classification operation, and as one example, the classifier may be a convolutional PatchGAN classifier. Further, the discriminators may include the k-th circumstance-specific discriminator.

For reference, the discriminator may be a discriminator in a generative adversarial network (GAN) model.

In general, the GAN model may include a generator and a discriminator. Herein, (i) the generator may transform its input into a fake image, e.g., a segmentation map, and (ii) the discriminator may output a probability representing whether its input, e.g., the segmentation map, which is outputted from the generator, is a fake image or a real image.

Herein, the generator may include a convolutional layer and a deconvolutional layer. Therefore, a k-th circumstance-specific generator is described below as including the k-th circumstance-specific convolutional layer and the k-th circumstance-specific deconvolutional layer.

First, to describe operation of the learning device 1000 in detail, at least one k-th training image, which corresponds to a k-th driving circumstance and includes a k-th object label and a k-th segmentation label, may be selected from all training images. Herein, all the training images include first training images to n-th training images. Herein, each of the first training images may correspond to a first driving circumstance and may include a first object label and a first segmentation label, and further, each of the n-th training images may correspond to an n-th driving circumstance and may include an n-th object label and an n-th segmentation label. Herein, n may be an integer equal to or greater than 1, and further, k may be an integer equal to or greater than 1 and equal to or less than n.

For example, the first driving circumstance to the n-th driving circumstance may include at least part of a driving circumstance in an urban area, a driving circumstance in a suburb, a driving circumstance in a mountainous area, a driving circumstance in a coastal area, a driving circumstance in which it rains, a driving circumstance in which it snows, etc. However, these are just a few examples of various driving circumstances, and the first driving circumstance to the n-th driving circumstance may include at least part of any driving circumstances that the autonomous vehicle may encounter.

And the learning device 1000 may perform or support another device to perform a process of inputting the k-th training image into a k-th circumstance-specific object detector 1100-k, corresponding to a k-th driving circumstance, among a first object detector corresponding to the first driving circumstance to an n-th object detector corresponding to the n-th driving circumstance, to thereby allow the k-th circumstance-specific object detector 1100-k to detect at least one object from the k-th training image and thus to generate k-th circumstance-specific object detection information.

As an example, the learning device 1000 may perform or support another device to perform a process of inputting the k-th training image into the k-th circumstance-specific object detector 1100-k, to thereby allow the k-th circumstance-specific object detector 1100-k to (i) apply at least one convolution operation to the k-th training image and thus generate a k-th circumstance-specific feature map, via at least one k-th circumstance-specific convolutional layer of the k-th circumstance-specific object detector 1100-k, (ii) apply at least one ROI (region of interest) pooling operation to the k-th circumstance-specific feature map by using k-th circumstance-specific ROI information corresponding to at least one region, estimated as including at least one object, on the k-th circumstance-specific feature map and thus generate a k-th circumstance-specific pooled feature map, via a k-th circumstance-specific pooling layer of the k-th circumstance-specific object detector 1100-k, and (iii) apply at least one fully-connected operation to the k-th circumstance-specific pooled feature map and thus generate k-th circumstance-specific object detection information, via a k-th circumstance-specific FC layer of the k-th circumstance-specific object detector 1100-k.

Herein, the learning device 1000 may perform or support another device to perform a process of allowing the k-th circumstance-specific object detector 1100-*k* to generate the k-th circumstance-specific ROI information via a k-th circumstance-specific RPN layer of the k-th circumstance-specific object detector 1100-*k*.

Also, the learning device 1000 may perform or support another device to perform a process of inputting the k-th circumstance-specific feature map into a k-th circumstance-specific ranking network 1200-*k*, corresponding to the k-th circumstance-specific object detector 1100-*k*, among a first ranking network corresponding to the first object detector to an n-th ranking network corresponding to the n-th object detector, to thereby allow the k-th circumstance-specific ranking network 1200-*k* to apply at least one deconvolution operation to the k-th circumstance-specific feature map and thus to generate a k-th circumstance-specific segmentation map, via at least one k-th circumstance-specific deconvolutional layer of the k-th circumstance-specific ranking network 1200-*k*.

For reference, the k-th circumstance-specific generator may include the k-th circumstance-specific convolutional layer and the k-th circumstance-specific deconvolutional layer. Herein, the k-th circumstance-specific generator, corresponding to the k-th circumstance-specific discriminator, may share the k-th circumstance-specific convolutional layer with the k-th circumstance-specific object detector 1100-*k*.

That is, the k-th circumstance-specific generator may generate the k-th circumstance-specific segmentation map as an output corresponding to the k-th training image.

And, the learning device 1000 may perform or support another device to perform a process of allowing the k-th circumstance-specific ranking network 1200-*k* to further generate a k-th circumstance-specific rank score, representing whether a k-th circumstance-specific rank map is real or fake, via the k-th circumstance-specific discriminator. Herein, the k-th circumstance-specific rank map may be created by cropping a main region on the k-th training image and its corresponding at least one first subordinate region on at least one k-th circumstance-specific segmentation map and then by concatenating the main region and the first subordinate region.

Specifically, the k-th circumstance-specific rank map inputted into the k-th circumstance-specific discriminator may include information on the k-th training image in addition to information on the k-th circumstance-specific segmentation map outputted from the k-th circumstance-specific generator. This is to allow the k-th circumstance-specific discriminator to utilize more rich information when determining whether the k-th circumstance-specific rank map inputted into the k-th circumstance-specific discriminator is real or fake. For reference, each of (i) the main region on the k-th training image, (ii) the first subordinate region on the k-th circumstance-specific segmentation map, (iii) a second subordinate region on a k-th circumstance-specific segmentation label to be described later, and (iv) at least one third subordinate region on at least one j-th circumstance-specific segmentation map to be described later may correspond to a same region.

And, the learning device 1000 may perform or support another device to perform (i) a process of training the k-th circumstance-specific object detector 1100-*k* such that k-th circumstance-specific object detection losses, calculated by referring to the k-th circumstance-specific object detection information and its corresponding k-th circumstance-specific object label, are minimized and a process of training the k-th circumstance-specific deconvolutional layer and the k-th circumstance-specific convolutional layer such that the k-th circumstance-specific rank score is maximized and (ii) a process of training the k-th circumstance-specific discriminator such that a k-th circumstance-specific label rank score on a k-th circumstance-specific label rank map is maximized and such that the k-th circumstance-specific rank score is minimized. Herein, the k-th circumstance-specific label rank map may be created by cropping the main region on the k-th training image and its corresponding second subordinate region on a k-th circumstance-specific segmentation label and then by concatenating the main region and the second subordinate region. Further, the k-th circumstance-specific label rank score may be calculated by the k-th circumstance-specific discriminator.

Also, the learning device 1000 may perform or support another device to perform a process of training each of the k-th circumstance-specific deconvolutional layer and the k-th circumstance-specific convolutional layer such that k-th circumstance-specific segmentation losses, calculated by referring to the k-th circumstance-specific segmentation map and its corresponding k-th circumstance-specific segmentation label, are minimized and such that the k-th circumstance-specific rank score is maximized.

Also, the learning device 1000 may perform or support another device to perform a process of further training the k-th circumstance-specific RPN layer such that k-th circumstance-specific RPN losses, calculated by referring to the k-th circumstance-specific ROI information and its corresponding k-th circumstance-specific object label, are minimized.

A learning method for further improving performance of the discriminator is described below.

Figure 3:
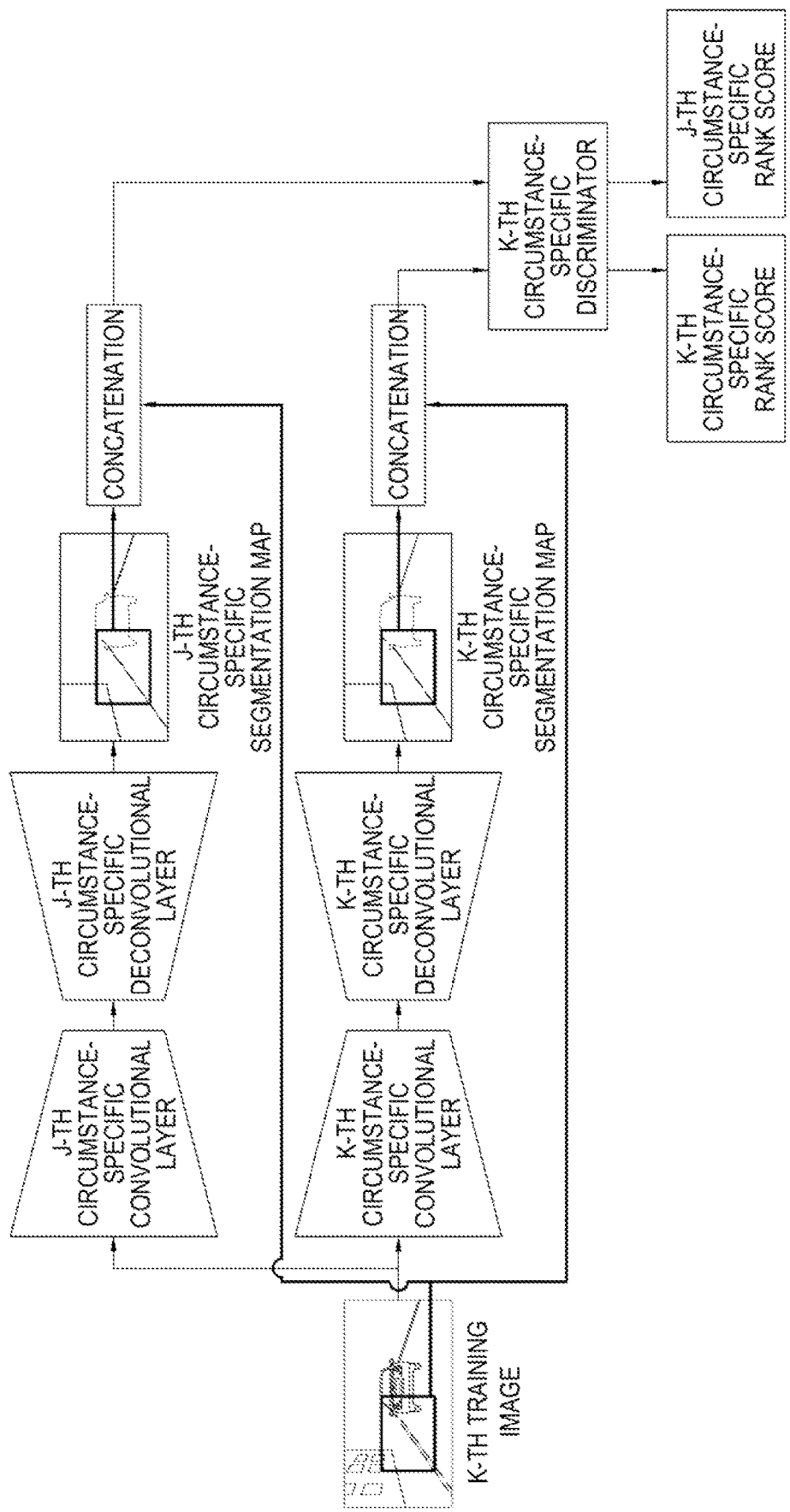

By referring to FIG. 3, the learning device 1000 may perform or support another device to perform a process of allowing the k-th circumstance-specific discriminator to further generate a k-th circumstance-specific rank score representing whether a k-th circumstance-specific rank map is real or fake. Herein, the k-th circumstance-specific rank map may be created by cropping the main region on the k-th training image and its corresponding first subordinate region on the k-th circumstance-specific segmentation map and then by concatenating the main region and the first subordinate region.

Also, the learning device 1000 may perform or support another device to perform a process of allowing the k-th circumstance-specific discriminator to further generate at least one j-th circumstance-specific rank score representing whether at least one j-th circumstance-specific rank map is real or fake. Herein, the j-th circumstance-specific rank map may be created by cropping the main region on the k-th training image and its corresponding at least one third subordinate region on the j-th circumstance-specific segmentation map and then by concatenating the main region and the third subordinate region. Further, j may be an integer, different from k, ranging from 1 to n.

Herein, the j-th circumstance-specific segmentation map may be generated by at least one j-th circumstance-specific generator, except the k-th circumstance-specific generator corresponding to the k-th circumstance-specific discriminator.

For reference, the j-th circumstance-specific generator may include the j-th circumstance-specific convolutional layer and its corresponding j-th circumstance-specific deconvolutional layer, except the k-th circumstance-specific convolutional layer corresponding to the k-th circumstance-specific discriminator.

That is, at least one j-th circumstance-specific convolutional layer may apply the convolution operation to the k-th training image to thereby create at least one j-th circumstance-specific feature map, and then at least one j-th circumstance-specific deconvolutional layer, corresponding to the j-th circumstance-specific convolutional layer, may apply the deconvolution operation to the j-th circumstance-specific feature map, to thereby generate at least one j-th circumstance-specific segmentation map.

As one example, in order to further improve a performance of the first discriminator, the learning device 1000 may perform or support another device to perform (i) a process of outputting the third circumstance-specific segmentation map on the first training image via the third generator, among the second generator to the n-th generator except the first generator, and (ii) a process of allowing the first ranking network to further generate a third circumstance-specific rank score on a third circumstance-specific rank map via the first discriminator. Herein, the third circumstance-specific segmentation map corresponds to the first driving circumstance corresponding to the first discriminator. Further, the third circumstance-specific rank map may be generated by cropping the first main region on the first training image and its corresponding third subordinate region on the third circumstance-specific segmentation map and then by concatenating the first main region and the third subordinate region.

As another example, in order to further improve a performance of the first discriminator, the learning device 1000 may perform or support another device to perform (i) a process of outputting (i-1) a fifth circumstance-specific segmentation map on the first training image via the fifth generator and (i-2) a seventh circumstance-specific segmentation map on the first training image via the seventh generator and (ii) a process of allowing the first ranking network to further generate a fifth circumstance-specific rank score on a fifth circumstance-specific rank map and a seventh circumstance-specific rank score on a seventh circumstance-specific rank map, via the first discriminator. Herein, the fifth circumstance-specific segmentation map and the seventh circumstance-specific segmentation map correspond to the first driving circumstance corresponding to the first discriminator. Further, the fifth circumstance-specific rank map may be generated by cropping the first main region on the first training image and its corresponding third subordinate region on the fifth circumstance-specific segmentation map and then by concatenating the first main region on the first training image and the third subordinate region on the fifth circumstance-specific segmentation map. Further, the seventh circumstance-specific rank map may be generated by cropping the first main region on the first training image and its corresponding third subordinate region on the seventh circumstance-specific segmentation map and then by concatenating the first main region on the first training image and the third subordinate region on the seventh circumstance-specific segmentation map.

And, the learning device 1000 may perform or support another device to perform a process of training the k-th circumstance-specific discriminator such that the k-th circumstance-specific label rank score is maximized and such that each of the k-th circumstance-specific rank score and the j-th circumstance-specific rank score is minimized.

An objective function, to be used for training the object detector and its corresponding ranking network, is described below.

First, a GAN loss to be used for training (i) a discriminator and (ii) a generator, including a convolutional layer and a deconvolutional layer corresponding to the discriminator, may be calculated by using an equation 1 below.

$$L_{GAN} = E_{x,y}[\log D(x,y)] + E_x[\log(1 - D(x, G(x)))] \quad \text{<Equation 1>}$$

Herein, x may be the training image, y may be the segmentation label, G(x) may be the segmentation map outputted from the generator, D(x,y) may be the label rank score, outputted from the discriminator, on the label rank map created by cropping a main region on the training image and its corresponding second subordinate region on the segmentation label and then by concatenating the main region and the second subordinate region, and D(x, G(x)) may be the rank score, outputted from the discriminator, on the rank map created by cropping the main region on the training image and its corresponding first subordinate region on the segmentation map and then by concatenating the main region and the first subordinate region.

And, a segmentation loss may be calculated by using an equation 2 below.

$$L_{seg} = L_{ce}(G(x), y) \quad \text{<Equation 2>}$$

Herein, $L_{ce}$ may be a cross-entropy loss.

Next, an object detection loss to be used for training the discriminator may be calculated by using an equation 3 below.

$$L_D = L_{rpn}(R(x), y_{rpn}) + L_{det}(O(x), y_{det}) \quad \text{<Equation 3>}$$

Herein, R(x) may be the ROI information outputted from the RPN, O(x) may be the object detection information outputted from the object detector, $y_{rpn}$ may be a target label, outputted from the RPN layer, included in the object label, and $y_{det}$ may be a target label, outputted from the object detector, included in the object label.

And, a discriminator loss to be used for training the discriminator may be calculated by using an equation 4 below. Herein, the discriminator loss may be calculated by referring to information regarding other generators excluding a specific generator corresponding to a specific discriminator to be trained.

$$L_{comp} = E_{n,x}[\log(1 - D(x, G_n(x)))] \quad \text{<Equation 4>}$$

Herein, $G_n(x)$ may be at least one other segmentation map outputted from at least one other generator, excluding the specific generator corresponding to the specific discriminator, and $D(x, G_n(x))$ may be the rank score, outputted from the specific discriminator, on the rank map created by cropping a main region on the training image and its corresponding third subordinate region on said at least one other segmentation map and then by concatenating the main region and the third subordinate region.

In summary, the objective function may be represented by an equation 5 below using the equation 1 to equation 4.

$$\text{objective function} = \arg\min_{G,R,O} \max_D L_{GAN}(G, D) + \lambda L_{seg}(G) + L_D(R, O) + L_{comp}(D) \quad \text{<Equation 5>}$$

For reference, λ above may be arbitrarily chosen to adjust the segmentation loss.

The learning device 1000 may perform or support another device to perform a process of training the object detector 1100 and its corresponding ranking network as follows, by using the objective function of the equation 5.

First, on condition that parameters of the discriminator are prevented from being updated, the learning device 1000 may perform or support another device to perform a process of training (i) the convolutional layer and the deconvolutional layer included in the generator, (ii) the object detector, and (iii) the RPN layer, by using $$\underset{G,R,O}{\arg\min}\, L_{GAN}(G, D) + \lambda L_{seg}(G) + L_D(R, O)$$

in the objective function of the equation 5.

That is, (i) the convolutional layer and the deconvolutional layer included in the generator, (ii) the object detector, and (iii) the RPN layer may be trained such that each of (i) $L_{GAN}(G,D)$, (ii) $\lambda L_{seg}(G)$, and (iii) $L_D(R,O)$ is minimized according to $$\underset{G,R,O}{\arg\min}\, L_{GAN}(G, D) + \lambda L_{seg}(G) + L_D(R, O).$$

Specifically, on condition that the parameters of the discriminator are prevented from being updated, the generator may be trained in order to minimize $L_{GAN}(G,D)$, i.e., $E_{x,y}[\log D(x,y)]+E_x[\log(1-D(x,G(x)))]$, in other words, to maximize $D(x,G(x))$, i.e., the rank score.

And, on condition that parameters of the generator are prevented from being updated, the learning device 1000 may perform or support another device to perform a process of training the discriminator by using $$\underset{D}{\arg\max}\, L_{GAN}(G, D) + L_{comp}(D)$$

in the objective function of the equation 5.

That is, the discriminator may be trained such that each of $L_{GAN}(G,D)$ and $L_{comp}(D)$ is maximized according to $$\underset{D}{\arg\max}\, L_{GAN}(G, D) + L_{comp}(D).$$

Specifically, on condition that the parameters of the generator are prevented from being updated, the discriminator may be trained such that (i) $D(x,y)$, i.e., the label rank score, is maximized and (ii) $D(x,G(x))$, i.e., the rank score, is minimized, in order to maximize $L_{GAN}(G,D)$, i.e., $E_{x,y}[\log D(x,y)]+E_x[\log(1-D(x, G(x)))]$.

For reference, as described above, the learning device 1000 may perform or support another device to perform a process of training (i) the convolutional layer and the deconvolutional layer included in each generator, (ii) each object detector, and (iii) each RPN layer and then a process of training each discriminator corresponding to each generator. But the scope of the present disclosure is not limited thereto, and the learning device 1000 may perform or support another device to perform a process of training each discriminator corresponding to each generator and then a process of training (i) the convolutional layer and the deconvolutional layer included in each generator, (ii) each object detector, and (iii) each RPN layer, corresponding to each discriminator.

In a case that each generator, each discriminator, and each object detector have been trained as such, processes of an updating device if at least one driving circumstance image is acquired are described by referring to FIGS. 4 to 7.

Figure 4:
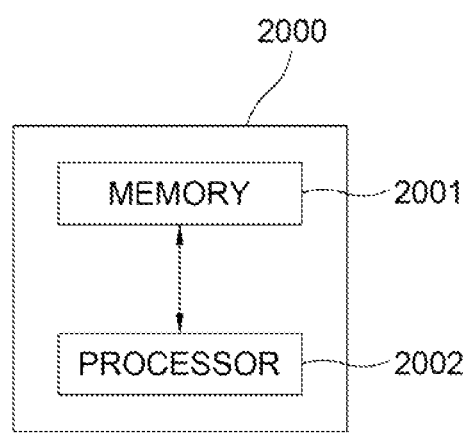
FIG. 4 is a drawing schematically illustrating an updating device for allowing the object detector of the autonomous vehicle to be updated as a specific object detector suitable for a specific driving circumstance in accordance with one example embodiment of the present disclosure.

First, by referring to FIG. 4, the updating device for allowing the object detector of the autonomous vehicle to be updated as a specific object detector suitable for a specific driving circumstance in accordance with one example embodiment of the present disclosure is described. Herein, the specific object detector suitable for the specific driving circumstance may be the object detector optimal for the specific driving circumstance.

The updating device 2000 may include a memory 2001 for storing instructions to update the object detector of the autonomous vehicle as the specific object detector corresponding to the specific driving circumstance and a processor 2002 for performing processes of updating the object detector of the autonomous vehicle as the specific object detector corresponding to the specific driving circumstance according to the instructions in the memory 2001.

Specifically, the training device 2000 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The processor of the computing device may include hardware configuration of MPU (Micro Processing Unit) or CPU (Central Processing Unit), cache memory, data bus, etc. Additionally, the computing device may further include software configuration of OS and applications that achieve specific purposes.

However, such description of the computing device does not exclude an integrated device including any combination of a processor, a memory, a medium, or any other computing components for implementing the present disclosure.

Herein, the updating device 2000 may be same as or different from the learning device 1000 shown in FIG. 1.

Figure 5:
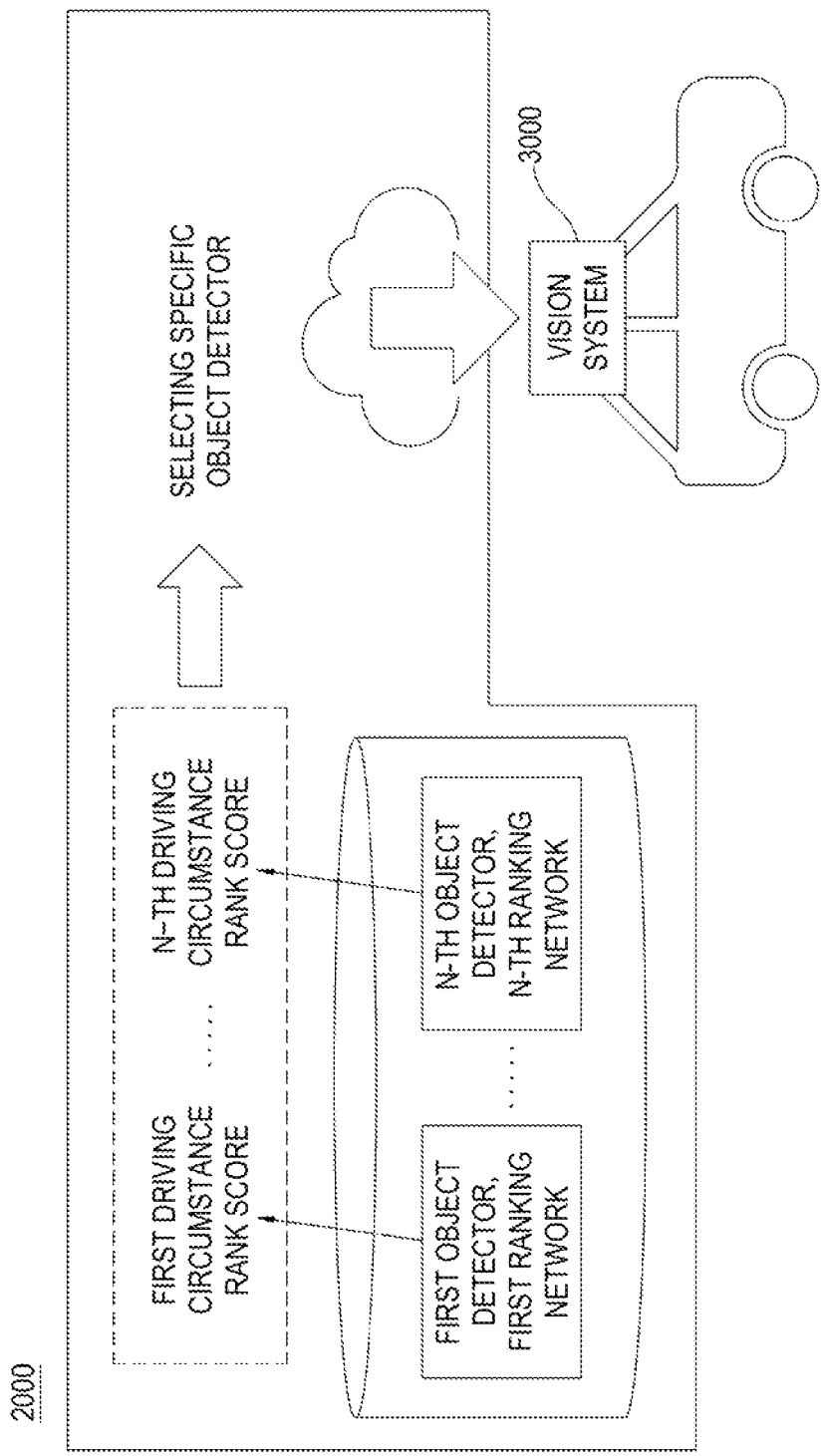
FIGS. 5 and 6 are drawings schematically illustrating processes of updating the object detector of the autonomous vehicle to the specific object detector in accordance with one example embodiment of the present disclosure.

By referring to FIG. 5, if the driving circumstance image, representing the driving circumstance of the autonomous vehicle, is acquired from a vision system 3000 of the autonomous vehicle, the updating device 2000 may perform or support another device to perform a process of allowing the first ranking network to the n-th ranking network to respectively generate a first driving circumstance rank score to an n-th driving circumstance rank score, corresponding to the driving circumstance image.

And the updating device 2000 may perform or support another device to perform (i) a process of selecting the specific object detector corresponding to a specific ranking network which outputs a specific driving circumstance rank score, the specific driving circumstance rank score being the highest among the first driving circumstance rank score to the n-th driving circumstance rank score and (ii) a process of updating a current object detector of the autonomous vehicle as the specific object detector.

As an example, the updating device 2000 may perform or support another device to perform a process of transmitting an optimal object detector to the vision system 3000 of the autonomous vehicle over a wired connection, to thereby update the current object detector of the autonomous vehicle as the specific object detector.

As another example, the updating device 2000 may perform or support another device to perform a process of transmitting the optimal object detector wirelessly to the vision system 3000 of the autonomous vehicle, to thereby update the current object detector of the autonomous vehicle as the specific object detector.

That is, the updating device 2000 may perform or support another device to perform a process of transmitting the optimal object detector over-the-air to the vision system 3000 of the autonomous vehicle, to thereby update the current object detector of the autonomous vehicle as the specific object detector.

Figure 6:
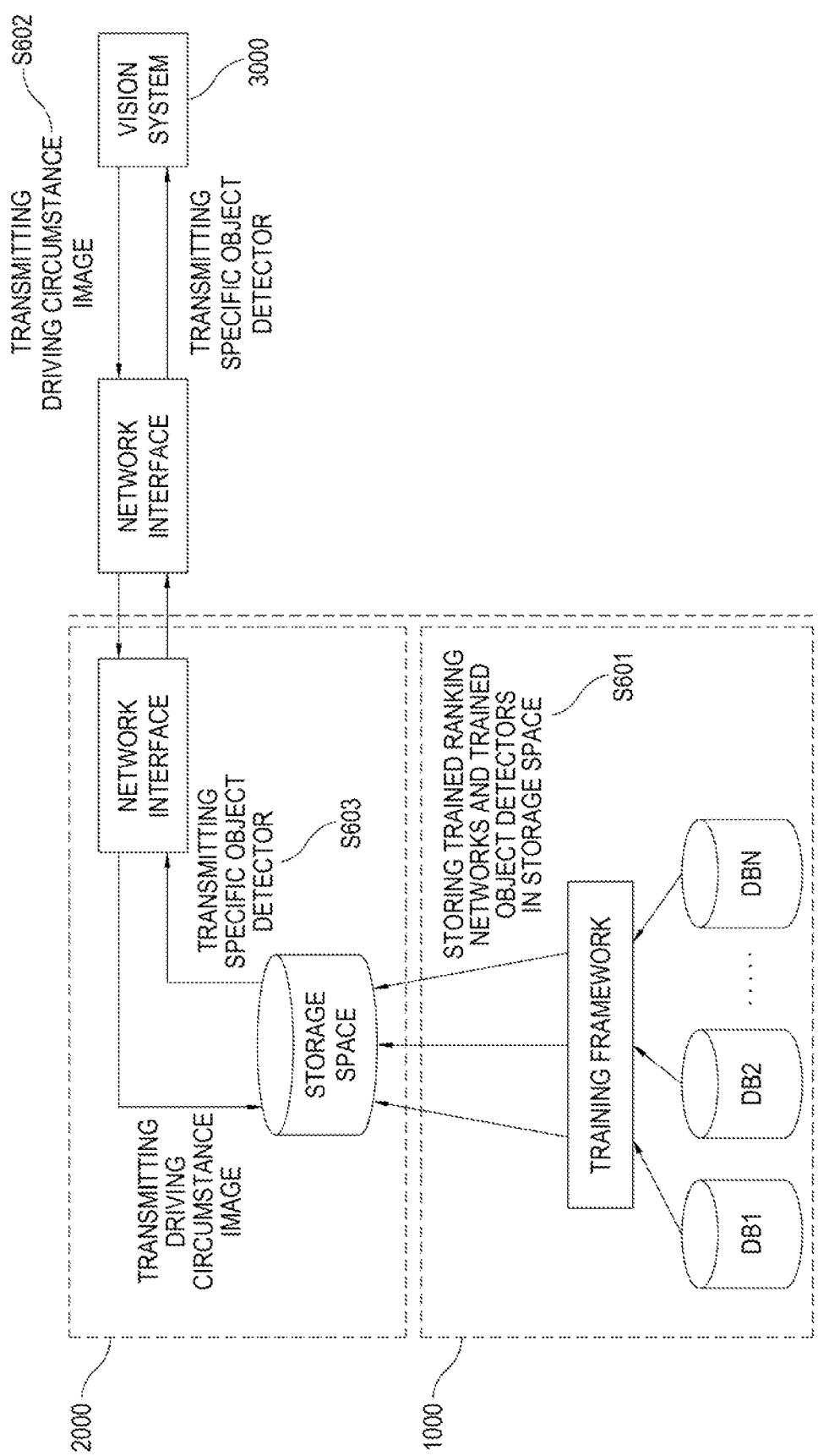

Processes of updating the current object detector of the autonomous vehicle as the specific object detector are described in detail below by referring to FIG. 6.

First, on condition that the learning device 1000 has performed or supported another device to perform a process of training the first ranking network to the n-th ranking network and the first object detector to the n-th object detector by using the first training images to the n-th training images retrieved from a database, and on condition that the trained first ranking network to the trained n-th ranking network and the trained first object detector to the trained n-th object detector have been stored in a storage space at a step of S601, if the driving circumstance image is acquired from the vision system 3000 of the autonomous vehicle at a step of S602, the updating device 2000 may perform or support another device to perform a process of allowing the first ranking network to the n-th ranking network stored in the storage space to respectively generate the first driving circumstance rank score to the n-th driving circumstance rank score, corresponding to the driving circumstance image.

And the updating device 2000 may perform or support another device to perform (i) a process of selecting the specific object detector corresponding to the specific ranking network which outputs the specific driving circumstance rank score, the specific driving circumstance rank score being the highest among the first driving circumstance rank score to the n-th driving circumstance rank score and (ii) a process of transmitting the specific object detector to the vision system 3000 of the autonomous vehicle at a step of S603, to thereby update the current object detector of the autonomous vehicle as the specific object detector.

Figure 7:
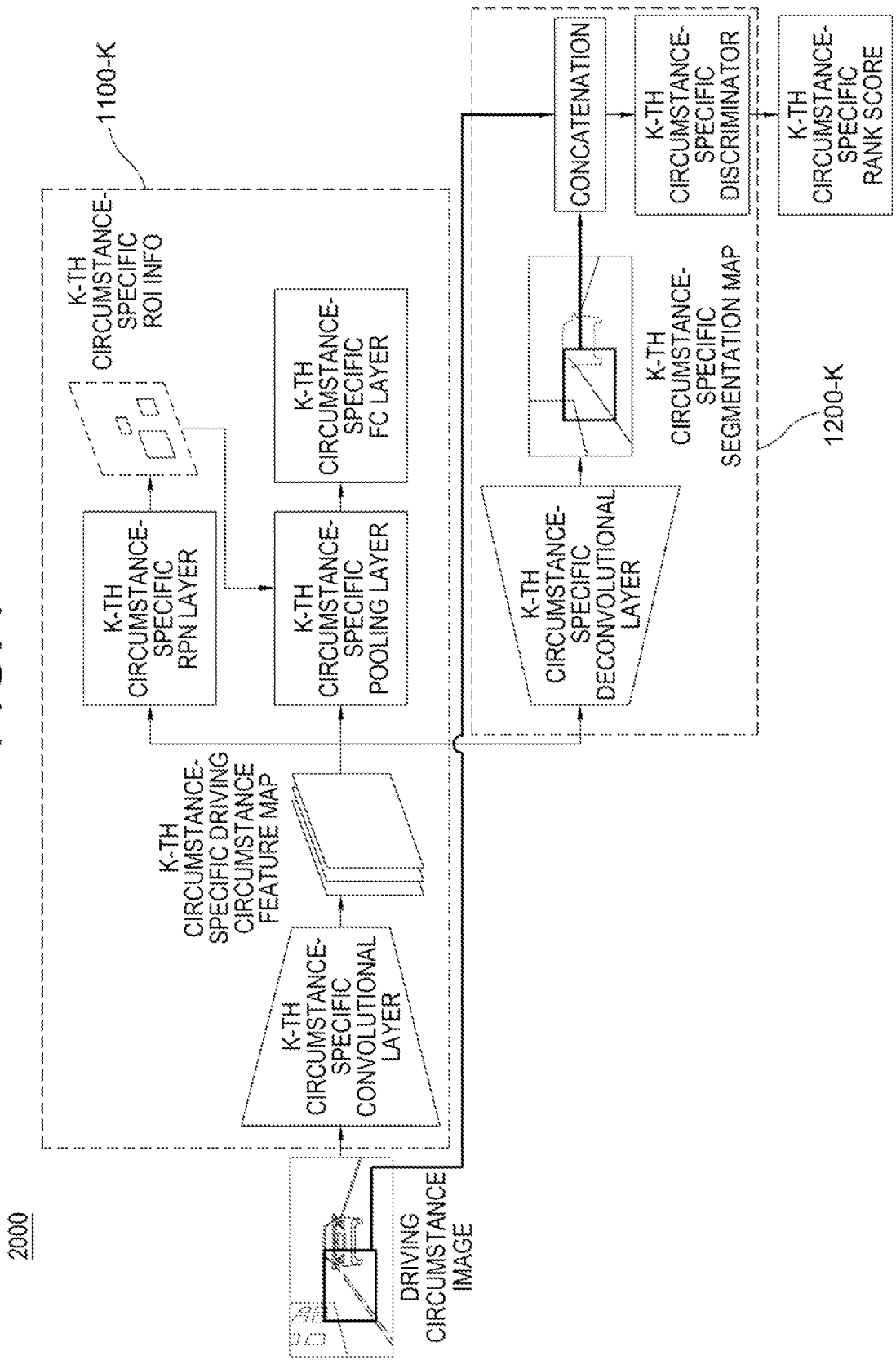
FIG. 7 is a drawing schematically illustrating a method for updating the object detector of the autonomous vehicle to the specific object detector in accordance with one example embodiment of the present disclosure.

A method for updating the object detector of the autonomous vehicle as the specific object detector is described by referring to FIG. 7 below.

For reference, the updating device 2000 in accordance with the present disclosure may perform its operation on at least part of the first object detector to the n-th object detector and their respectively corresponding first ranking network to the n-th ranking network. However, for convenience of explanation, FIG. 7 only shows (1) the k-th circumstance-specific object detector 1100-*k* corresponding to the k-th driving circumstance and (2) the k-th circumstance-specific ranking network 1200-*k* corresponding to the k-th circumstance-specific object detector 1100-*k*.

First, if the driving circumstance image is acquired, the updating device 2000 may perform or support another device to perform (i) a process of inputting the driving circumstance image into each of the first object detector to the n-th object detector, to thereby allow each of the first object detector to the n-th object detector to apply its corresponding at least one convolution operation to the driving circumstance image via its corresponding each of the first convolutional layer to the n-th convolutional layer and thus to generate each of a first driving circumstance feature map to an n-th driving circumstance feature map and (ii) a process of inputting the first driving circumstance feature map to the n-th driving circumstance feature map respectively into the first ranking network to the n-th ranking network, to thereby allow each of the first ranking network to the n-th ranking network to (ii-1) apply its corresponding at least one deconvolution operation to each of the first driving circumstance feature map to the n-th driving circumstance feature map via its corresponding each of the first deconvolutional layer to the n-th deconvolutional layer and thus generate each of a first driving circumstance segmentation map to an n-th driving circumstance segmentation map and (ii-2) generate a first driving circumstance rank score to an n-th driving circumstance rank score respectively via the first discriminator to the n-th discriminator. Herein, the first driving circumstance rank score may represent whether a first driving circumstance rank map is real or fake. Further, the first driving circumstance rank map may be created by cropping a first driving main region on the driving circumstance image and its corresponding first driving subordinate region on the first driving circumstance segmentation map and then by concatenating the first driving main region and the first driving subordinate region. Also, the n-th driving circumstance rank score may represent whether an n-th driving circumstance rank map is real or fake. And further, the n-th driving circumstance rank map may be created by cropping an n-th driving main region on the driving circumstance image and its corresponding n-th driving subordinate region on the n-th driving circumstance segmentation map and then by concatenating the n-th driving main region and the n-th driving subordinate region.

And the updating device 2000 may perform or support another device to perform (i) a process of selecting the specific object detector, corresponding to the specific ranking network which outputs the specific driving circumstance rank score, the specific driving circumstance rank score being the highest among the first driving circumstance rank score to the n-th driving circumstance rank score and (ii) a process of updating the current object detector of the autonomous vehicle as the specific object detector. Herein, for example, the specific object detector may be the k-th circumstance-specific object detector 1100-*k*, the specific ranking network may be the k-th circumstance-specific ranking network 1200-*k*, and the specific driving circumstance rank score may be the k-th circumstance-specific driving circumstance rank score.

As a result, the updating device 2000 may allow the autonomous vehicle to be properly driven in various driving circumstances by using the optimal object detector.

Although a case of the object detector used in the autonomous vehicle is described above, however, as other examples, the object detector may be used in various devices such as autonomous aircrafts, autonomous robots, etc.

Also, a case of updating the object detector is described above, but the scope of the present disclosure is not limited thereto, and the same method may be used for updating various deep learning network models used in the autonomous vehicles, the autonomous aircrafts, the autonomous robots, etc.

The present disclosure has an effect of allowing the autonomous vehicle to run smoothly in various driving circumstances.

The present disclosure has another effect of updating the object detector of the autonomous vehicle as the optimal object detector suitable for each driving circumstance.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to those skilled in the art. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present disclosure and vice versa.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A training method for updating an object detector of a plurality of object detectors, based on deep learning, of an autonomous vehicle to adapt the object detector to a driving circumstance,
    wherein, there are 1 to n object detectors of the plurality, each object detector of the plurality including a camera and collecting images corresponding to a driving circumstance associated with the autonomous vehicle, at least a portion of the images being used as training images for the object detector,
    wherein, there are 1 to n driving circumstances, each driving circumstance including at least one of a geographic region, a time of day, and a weather condition;
    wherein each driving circumstance further includes an object associated with at least one of a paved road, an unpaved road, an alleyway, a land lot, a sea, a lake, a river, a mountain, a forest, a desert, a sky, an indoor space, a vehicle, a person, an animal, a plant, a building, a flying object, and an obstacle;
    wherein, for each driving circumstance, there are first training images to n-th training images, each training image including one or more road features represented by an object label and a segmentation label, the object label including a least one of a road object level classification and a non-road object level classification, the segmentation label including a pixel level object classification;
    wherein each of the first training images corresponds to a first driving circumstance and includes a first object label and a first segmentation label;
    wherein each of the n-th training images corresponds to an n-th driving circumstance and includes an n-th object label and an n-th segmentation label; and
    wherein k is an integer ranging from 1 to n;
the training method comprising:
    (a) if at least one k-th training image is acquired from first training images to n-th training images, a learning device performing or supporting another device to perform
        (i) a process of inputting the k-th training image into a k-th object detector, corresponding to a k-th driving circumstance, among a first object detector corresponding to the first driving circumstance to an n-th object detector corresponding to the n-th driving circumstance, to thereby allow the k-th object detector to
            (i-1) apply at least one convolution operation to the k-th training image and thus generate a k-th feature map of the k-th driving circumstance, via at least one k-th convolutional layer of the k-th object detector,
            (i-2) apply at least one region of interest pooling operation to the k-th feature map by using k-th region of interest information corresponding to at least one region, estimated as including at least one object, on the k-th feature map and thus generate a k-th pooled feature map, via a k-th pooling layer of the k-th object detector, and
            (i-3) apply at least one fully-connected operation to the k-th pooled feature map and thus generate k-th object detection information, via a k-th fully connected layer of the k-th object detector and
        (ii) a process of inputting the k-th feature map into a k-th ranking network, corresponding to the k-th object detector, among a first ranking network corresponding to the first object detector to an n-th ranking network corresponding to the n-th object detector, to thereby allow the k-th ranking network to
            (ii-1) apply at least one deconvolution operation to the k-th feature map and thus generate a k-th segmentation map, via at least one k-th deconvolutional layer of the k-th ranking network and
            (ii-2) generate a k-th rank score, representing whether a k-th rank map is real or fake, via a k-th discriminator of the k-th ranking network,
        wherein the k-th rank map is created by cropping a main region on the k-th training image and its corresponding first subordinate region on a k-th segmentation map and then by concatenating the main region and the first subordinate region; and
    (b) the learning device performing or supporting another device to perform
        (i) a process of training the k-th object detector such that k-th object detection losses, calculated by referring to the k-th object detection information and its corresponding k-th object label, are minimized and a process of training the at least one k-th deconvolutional layer and the at least one k-th convolutional layer such that the k-th rank score is maximized and
        (ii) a process of training the k-th discriminator such that a k-th label rank score on a k-th label rank map is maximized and such that the k-th rank score is minimized,
    wherein the k-th label rank map is created by cropping the main region on the k-th training image and its corresponding second subordinate region on a k-th segmentation label and then by concatenating the main region and the second subordinate region and
    wherein the k-th label rank score is calculated by the k-th discriminator, wherein the k-th object detector has, after the training method, improved detection of the k-th driving circumstance when compared to detection of the k-th driving circumstance by the k-th object detector before the training method.

2. The method of claim 1, wherein, at the step of (a), the learning device performs or supports another device to perform a process of allowing the k-th ranking network to further generate at least one j-th rank score, representing whether at least one j-th rank map is real or fake, via the k-th discriminator, wherein at least one j-th convolutional layer applies the convolution operation to the k-th training image to thereby create at least one j-th feature map, wherein at least one j-th deconvolutional layer, corresponding to the j-th convolutional layer, applies the deconvolution operation to the j-th feature map to thereby generate at least one j-th segmentation map, wherein the j-th rank map is created by cropping the main region on the k-th training image and its corresponding at least one third subordinate region on the j-th segmentation map and then by concatenating the main region and the third subordinate region, and wherein j is an integer, different from k, ranging from 1 to n, and wherein, at the step of (b), the learning device performs or supports another device to perform a process of training the k-th discriminator such that the k-th label rank score is maximized and such that each of the k-th rank score and the j-th rank score is minimized.

3. The method of claim 1, wherein, at the step of (b), the learning device performs or supports another device to perform a process of training each of the at least one k-th deconvolutional layer and the k-th convolutional layer such that k-th segmentation losses, calculated by referring to the k-th segmentation map and its corresponding k-th segmentation label, are minimized and such that the k-th rank score is maximized.

4. The method of claim 1, wherein the k-th discriminator includes a Convolutional PatchGAN classifier.

5. The method of claim 1, wherein, at the step of (a), the learning device performs or supports another device to perform a process of allowing the k-th object detector to generate the k-th region of interest information via a k-th region proposal network layer of the k-th object detector, and wherein, at the step of (b), the learning device performs or supports another device to perform a process of further training the k-th region proposal network layer such that k-th region proposal network losses, calculated by referring to the k-th region of interest information and its corresponding k-th object label, are minimized.

6. A method for updating an object detector, based on deep learning, of an autonomous vehicle to adapt the object detector to a driving circumstance, wherein, the object detector is one of n object detectors of the autonomous vehicle and includes a camera and images corresponding to the driving circumstance, at least a portion of the images being used as training images for the object detector;

wherein, there are 1 to n driving circumstances, each driving circumstance including at least one of a geographic region, a time of day, and a weather condition;

wherein each driving circumstance further includes an object associated with at least one of a paved road, an unpaved road, an alleyway, a land lot, a sea, a lake, a river, a mountain, a forest, a desert, a sky, an indoor space, a vehicle, a person, an animal, a plant, a building, a flying object, and an obstacle;

wherein, for each driving circumstance, there are first training images to n-th training images, each training image including one or more road features represented by an object label and a segmentation label, the object label including a least one of a road object level classification and a non-road object level classification, the segmentation label including a pixel level object classification;

wherein each of the first training images corresponds to a first driving circumstance and includes a first object label and a first segmentation label;

wherein each of the n-th training images corresponds to an n-th driving circumstance and includes an n-th object label and an n-th segmentation label; and wherein k is an integer ranging from 1 to n;

the method comprising:

(a) an updating device, on condition that a learning device has performed or supported another device to perform, upon acquiring at least one k-th training image from the first training images to the n-th training images, (i) a process of inputting the k-th training image into a k-th object detector, corresponding to a k-th driving circumstance, among a first object detector corresponding to the first driving circumstance to an n-th object detector corresponding to the n-th driving circumstance, to thereby allow the k-th object detector to (i-1) apply at least one convolution operation to the k-th training image and thus generate a k-th feature map of the k-th driving circumstance, via at least one k-th convolutional layer of the k-th object detector, (i-2) apply at least one region of interest pooling operation to the k-th feature map by using k-th region of interest information corresponding to at least one region, estimated as including at least one object, on the k-th feature map and thus generate a k-th pooled feature map, via a k-th pooling layer of the k-th object detector, and (i-3) apply at least one fully-connected operation to the k-th pooled feature map and thus generate k-th object detection information, via a k-th fully connected layer of the k-th object detector, (ii) a process of inputting the k-th feature map into a k-th ranking network, corresponding to the k-th object detector, among a first ranking network corresponding to the first object detector to an n-th ranking network corresponding to the n-th object detector, to thereby allow the k-th ranking network to (ii-1) apply at least one deconvolution operation to the k-th feature map and thus generate a k-th segmentation map, via at least one k-th deconvolutional layer of the k-th ranking network and (ii-2) generate a k-th rank score, representing whether a k-th rank map is real or fake, via a k-th discriminator of the k-th ranking network, wherein the k-th rank map is created by cropping a main region on the k-th training image and its corresponding first subordinate region on a k-th segmentation map and then by concatenating the main region and the first subordinate region, (iii) a process of training the k-th object detector such that k-th object detection losses, calculated by referring to the k-th object detection information and its corresponding k-th object label, are minimized and a process of training the at least one k-th deconvolutional layer and the at least one k-th convolutional layer such that the k-th rank score is maximized, and (iv) a process of training the k-th discriminator such that a k-th label rank score on a k-th label rank map is maximized and such that the k-th rank score is minimized, wherein the k-th label rank map is created by cropping the main region on the k-th training image and its corresponding second subordinate region on a k-th segmentation label and then by concatenating the main region and the second subordinate region and wherein the k-th label rank score is calculated by the k-th discriminator, performing or supporting another device to perform a process of acquiring a image representing a driving circumstance of the autonomous vehicle;

(b) the updating device performing or supporting another device to perform (i) a process of inputting the image into each of the first object detector to the n-th object detector, to thereby allow each of the first object detector to the n-th object detector to apply its corresponding at least one convolution operation to the image via its corresponding each of the first convolutional layer to the n-th convolutional layer and thus to generate each of a first feature map corresponding to a first driving circumstance to an n-th feature map corresponding to a n-th driving circumstance and (ii) a process of inputting the first feature map to the n-th feature map respectively into the first ranking network to the n-th ranking network, to thereby allow each of the first ranking network to the n-th ranking network to (ii-1) apply its corresponding at least one deconvolution operation to each of the first feature map to the n-th feature map via its corresponding each of the first deconvolutional layer to the n-th deconvolutional layer and thus generate each of a first segmentation map to an n-th segmentation map and (ii-2) generate a first rank score to an n-th rank score respectively via the first discriminator to the n-th discriminator, wherein the first rank score represents whether a first rank map is real or fake, wherein the first rank map is created by cropping a first driving main region on the image and its corresponding first subordinate region on the first segmentation map and then by concatenating the first main region and the first subordinate region, wherein the n-th rank score represents whether an n-th rank map is real or fake, and wherein the n-th rank map is created by cropping an n-th main region on the image and its corresponding n-th subordinate region on the n-th segmentation map and then by concatenating the n-th main region and the n-th subordinate region; and (c) the updating device performing or supporting another device to perform (i) a process of selecting a specific object detector corresponding to a specific ranking network which outputs a specific rank score, the specific rank score being highest among the first rank score to the n-th rank score and (ii) a process of updating a current object detector of the autonomous vehicle as the specific object detector, wherein the specific object detector has, after the method, improved detection of the driving circumstance relative to other object detectors of the n object detectors of the autonomous vehicle.

7. The method of claim 6, wherein, at the step of (a), the learning device has performed or supported another device to perform a process of allowing the k-th ranking network to further generate at least one j-th rank score, representing whether at least one j-th rank map is real or fake, via the k-th discriminator, wherein at least one j-th convolutional layer applies the convolution operation to the k-th training image to thereby create at least one j-th feature map, wherein at least one j-th deconvolutional layer, corresponding to the j-th convolutional layer, applies the deconvolution operation to the j-th feature map to thereby generate at least one j-th segmentation map, wherein the j-th rank map is created by cropping the main region on the k-th training image and its corresponding at least one third subordinate region on the j-th segmentation map and then by concatenating the main region and the third subordinate region, and wherein j is an integer, different from k, ranging from 1 to n, and a process of training the k-th discriminator such that the k-th label rank score is maximized and such that each of the k-th rank score and the j-th rank score is minimized.

8. The method of claim 6, wherein, at the step of (a), the learning device has performed or supported another device to perform a process of training each of the k-th deconvolutional layer and the k-th convolutional layer such that k-th segmentation losses, calculated by referring to the k-th segmentation map and its corresponding k-th segmentation label, are minimized and such that the k-th rank score is maximized.

9. The method of claim 6, wherein the k-th discriminator includes a Convolutional PatchGAN classifier.

10. The method of claim 6, wherein, at the step of (a), the learning device has performed or supported another device to perform a process of further training the k-th region proposal network layer such that the k-th object detector generates the k-th region of interest information via a k-th region proposal network layer of the k-th object detector and such that k-th region proposal network losses, calculated by referring to the k-th region of interest information and its corresponding k-th object label, are minimized.

11. A learning device for updating an object detector, based on deep learning, of an autonomous vehicle to adapt the object detector to a driving circumstance, wherein, the object detector is one of n object detectors of the autonomous vehicle and includes a camera and images corresponding to the driving circumstance, at least a portion of the images being used as training images for the object detector, wherein, there are 1 to n driving circumstances, each driving circumstance including at least one of a geographic region, a time of day, and a weather condition;

wherein each driving circumstance further includes an object associated with at least one of a paved road, an unpaved road, an alleyway, a land lot, a sea, a lake, a river, a mountain, a forest, a desert, a sky, an indoor space, a vehicle, a person, an animal, a plant, a building, a flying object, and an obstacle;

wherein, for each driving circumstance, there are first training images to n-th training images, each training image including one or more road features represented by an object label and a segmentation label, the object label including a least one of a road object level classification and a non-road object level classification, the segmentation label including a pixel level object classification;

wherein each of the first training images corresponds to a first driving circumstance and includes a first object label and a first segmentation label;

wherein each of the n-th training images corresponds to an n-th driving circumstance and includes an n-th object label and an n-th segmentation label; and wherein k is an integer ranging from 1 to n;

the learning device comprising:

at least one memory that stores instructions; and at least one processor configured to execute the instructions to perform or support another device to perform:

(I) if at least one k-th training image is acquired from the first training images to the n-th training images,
  (i) a process of inputting the k-th training image into a k-th object detector, corresponding to a k-th driving circumstance, among a first object detector corresponding to the first driving circumstance to an n-th object detector corresponding to the n-th driving circumstance, to thereby allow the k-th circumstance-specific object detector to
    (i-1) apply at least one convolution operation to the k-th training image and thus generate a k-th feature map of the k-th driving circumstance, via at least one k-th convolutional layer of the k-th object detector,
    (i-2) apply at least one region of interest pooling operation to the k-th feature map by using k-th region of interest information corresponding to at least one region, estimated as including at least one object, on the k-th feature map and thus generate a k-th pooled feature map, via a k-th pooling layer of the k-th object detector, and
    (i-3) apply at least one fully-connected operation to the k-th pooled feature map and thus generate k-th object detection information, via a k-th fully connected layer of the k-th object detector and
  (ii) a process of inputting the k-th feature map into a k-th ranking network, corresponding to the k-th object detector, among a first ranking network corresponding to the first object detector to an n-th ranking network corresponding to the n-th object detector, to thereby allow the k-th ranking network to
    (ii-1) apply at least one deconvolution operation to the k-th feature map and thus generate a k-th segmentation map, via at least one k-th deconvolutional layer of the k-th ranking network and
    (ii-2) generate a k-th rank score, representing whether a k-th rank map is real or fake, via a k-th discriminator of the k-th ranking network, wherein the k-th rank map is created by cropping a main region on the k-th training image and its corresponding first subordinate region on a k-th segmentation map and then by concatenating the main region and the first subordinate region, and
(II) (i) a process of training the k-th object detector such that k-th object detection losses, calculated by referring to the k-th object detection information and its corresponding k-th object label, are minimized and a process of training the at least one k-th deconvolutional layer and the at least one k-th convolutional layer such that the k-th rank score is maximized and
  (ii) a process of training the k-th discriminator such that a k-th label rank score on a k-th label rank map is maximized and such that the k-th rank score is minimized, wherein the k-th label rank map is created by cropping the main region on the k-th training image and its corresponding second subordinate region on a k-th segmentation label and then by concatenating the main region and the second subordinate region and wherein the k-th label rank score is calculated by the k-th discriminator;
wherein the k-th object detector has, after the training, improved detection of the k-th driving circumstance when compared to detection of the k-th driving circumstance by the k-th object detector before the training method.

12. The learning device of claim 11, wherein, at the process of (I), the processor performs or supports another device to perform a process of allowing the k-th ranking network to further generate at least one j-th rank score, representing whether at least one j-th rank map is real or fake, via the k-th discriminator,
  wherein at least one j-th convolutional layer applies the convolution operation to the k-th training image to thereby create at least one j-th feature map,
  wherein at least one j-th deconvolutional layer, corresponding to the j-th convolutional layer, applies the deconvolution operation to the j-th feature map to thereby generate at least one j-th segmentation map,
  wherein the j-th rank map is created by cropping the main region on the k-th training image and its corresponding at least one third subordinate region on the j-th segmentation map and then by concatenating the main region and the third subordinate region, and
  wherein j is an integer, different from k, ranging from 1 to n, and
  wherein, at the process of (II), the processor performs or supports another device to perform a process of training the k-th discriminator such that the k-th label rank score is maximized and such that each of the k-th rank score and the j-th rank score is minimized.

13. The learning device of claim 11, wherein, at the process of (II), the processor performs or supports another device to perform a process of training each of the at least one k-th deconvolutional layer and the at least one k-th convolutional layer such that k-th segmentation losses, calculated by referring to the k-th segmentation map and its corresponding k-th segmentation label, are minimized and such that the k-th rank score is maximized.

14. The learning device of claim 11, wherein the k-th discriminator includes a Convolutional PatchGAN classifier.

15. The learning device of claim 11, wherein, at the process of (I), the processor performs or supports another device to perform a process of allowing the k-th object detector to generate the k-th ROI information via a k-th region proposal network layer of the k-th object detector, and
  wherein, at the process of (II), the processor performs or supports another device to perform a process of further training the k-th region proposal network layer such that k-th region proposal network losses, calculated by referring to the k-th region of interest information and its corresponding k-th object label, are minimized.

16. An updating device for updating an object detector, based on deep learning, of an autonomous vehicle to adapt the object detector to a driving circumstance,
  wherein, the object detector is one of n object detectors of the autonomous vehicle and includes a camera and images corresponding to the driving circumstance, at least a portion of the images being used as training images for the object detector;
  wherein, there are 1 to n driving circumstances, each driving circumstance including at least one of a geographic region, a time of day, and a weather condition;
  wherein each driving circumstance further includes an object associated with at least one of a paved road, an unpaved road, an alleyway, a land lot, a sea, a lake, a river, a mountain, a forest, a desert, a sky, an indoor space, a vehicle, a person, an animal, a plant, a building a flying object, and an obstacle;
  wherein, for each driving circumstance, there are first training images to n-th training images, each training image including one or more road features represented by an object label and a segmentation label, the object label including a least one of a road object level classification and a non-road object level classification, the segmentation label including a pixel level object classification;

wherein each of the first training images corresponds to a first driving circumstance and includes a first object label and a first segmentation label;

wherein each of the n-th training images corresponds to an n-th driving circumstance and includes an n-th object label and an n-th segmentation label; and wherein k is an integer ranging from 1 to n;

the updating device comprising:

at least one memory that stores instructions; and at least one processor configured to execute the instructions to perform or support another device to perform:

(I) on condition that a learning device has performed or supported another device to perform, upon acquiring at least one k-th training image from first training images to n-th training images,
- (i) a process of inputting the k-th training image into a k-th object detector, corresponding to a k-th driving circumstance, among a first object detector corresponding to the first driving circumstance to an n-th object detector corresponding to the n-th driving circumstance, to thereby allow the k-th object detector to
  - (i-1) apply at least one convolution operation to the k-th training image and thus generate a k-th feature map of the k-th driving circumstance, via at least one k-th convolutional layer of the k-th object detector,
  - (i-2) apply at least one region of interest pooling operation to the k-th feature map by using k-th region of interest information corresponding to at least one region, estimated as including at least one object, on the k-th feature map and thus generate a k-th pooled feature map, via a k-th pooling layer of the k-th object detector, and
  - (i-3) apply at least one fully-connected operation to the k-th pooled feature map and thus generate k-th object detection information, via a k-th fully connected layer of the k-th object detector,
- (ii) a process of inputting the k-th feature map into a k-th ranking network, corresponding to the k-th object detector, among a first ranking network corresponding to the first object detector to an n-th ranking network corresponding to the n-th object detector, to thereby allow the k-th ranking network to
  - (ii-1) apply at least one deconvolution operation to the k-th feature map and thus generate a k-th segmentation map, via at least one k-th deconvolutional layer of the k-th ranking network and
  - (ii-2) generate a k-th rank score, representing whether a k-th rank map is real or fake, via a k-th discriminator of the k-th ranking network, wherein the k-th rank map is created by cropping a main region on the k-th training image and its corresponding first subordinate region on a k-th segmentation map and then by concatenating the main region and the first subordinate region,
- (iii) a process of training the k-th object detector such that k-th object detection losses, calculated by referring to the k-th object detection information and its corresponding k-th object label, are minimized and a process of training the at least one k-th deconvolutional layer and the at least one k-th convolutional layer such that the k-th rank score is maximized, and
- (iv) a process of training the k-th discriminator such that a k-th label rank score on a k-th label rank map is maximized and such that the k-th rank score is minimized, wherein the k-th label rank map is created by cropping the main region on the k-th training image and its corresponding second subordinate region on a k-th segmentation label and then by concatenating the main region and the second subordinate region and wherein the k-th label rank score is calculated by the k-th discriminator, a process of acquiring an image representing a driving circumstance of the autonomous vehicle, (II) (i) a process of inputting the image into each of the first object detector to the n-th object detector, to thereby allow each of the first object detector to the n-th object detector to apply its corresponding at least one convolution operation to the image via its corresponding each of the first convolutional layer to the n-th convolutional layer and thus to generate each of a first feature map of the first driving circumstance to an n-th feature map of the n-th driving circumstance and (ii) a process of inputting the first driving circumstance feature map to the n-th driving circumstance feature map respectively into the first ranking network to the n-th ranking network, to thereby allow each of the first ranking network to the n-th ranking network to
- (ii-1) apply its corresponding at least one deconvolution operation to each of the first driving circumstance feature map to the n-th driving circumstance feature map via its corresponding each of the first deconvolutional layer to the n-th deconvolutional layer and thus generate each of a first segmentation map of the first driving circumstance to an n-th segmentation map of the second driving circumstance and
- (ii-2) generate a first rank score of the first driving circumstance to an n-th rank score of the n-th driving circumstance respectively via the first discriminator to the n-th discriminator, wherein the first rank score represents whether a first rank map is real or fake, wherein the first rank map is created by cropping a first main region on the image and its corresponding first subordinate region on the first segmentation map and then by concatenating the first main region and the first subordinate region, wherein the n-th rank score represents whether an n-th rank map is real or fake, and wherein the n-th rank map is created by cropping an n-th driving main region on the image and its corresponding n-th subordinate region on the n-th segmentation map and then by concatenating the n-th main region and the n-th subordinate region, and (III)(i) a process of selecting a specific object detector corresponding to a specific ranking network which outputs a specific rank score, the specific rank score being a highest among the first rank score to the n-th rank score and (ii) a process of updating a current object detector of the autonomous vehicle as the specific object detector;

wherein the specific object detector has, after the updating improved detection of the driving circumstance relative to other object detectors of the n object detectors of the autonomous vehicle.

17. The updating device of claim 16, wherein, at the process of (I), the learning device has performed or supported another device to perform a process of allowing the k-th ranking network to further generate at least one j-th rank score, representing whether at least one j-th rank map is real or fake, via the k-th discriminator,
  wherein at least one j-th convolutional layer applies the convolution operation to the k-th training image to thereby create at least one j-th feature map,
  wherein at least one j-th deconvolutional layer, corresponding to the j-th convolutional layer, applies the deconvolution operation to the j-th feature map to thereby generate at least one j-th segmentation map,
  wherein the j-th rank map is created by cropping the main region on the k-th training image and its corresponding at least one third subordinate region on the j-th segmentation map and then by concatenating the main region and the third subordinate region, and wherein j is an integer, different from k, ranging from 1 to n, and
  wherein a process of training the k-th discriminator such that the k-th label rank score is maximized and such that each of the k-th rank score and the j-th rank score is minimized.

18. The updating device of claim 16, wherein, at the process of (I), the learning device has performed or supported another device to perform a process of training each of the at least one k-th deconvolutional layer and the at least one k-th convolutional layer such that k-th segmentation losses, calculated by referring to the k-th segmentation map and its corresponding k-th segmentation label, are minimized and such that the k-th rank score is maximized.

19. The updating device of claim 16, wherein the k-th discriminator includes a Convolutional PatchGAN classifier.

20. The updating device of claim 16, wherein, at the process of (I), the learning device has performed or supported another device to perform a process of further training the k-th region proposal network layer such that the k-th object detector generates the k-th region of interest information via a k-th region proposal network layer of the k-th object detector and such that k-th region proposal network losses, calculated by referring to the k-th region of interest information and its corresponding k-th object label, are minimized.

* * * * *